United States Patent
Lillo

(10) Patent No.: US 11,724,727 B1
(45) Date of Patent: *Aug. 15, 2023

(54) LOAD-HANDLING APPARATUS AND METHODS

(71) Applicant: Steven B. Lillo, Mesa, AZ (US)

(72) Inventor: Steven B. Lillo, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,725

(22) Filed: Oct. 12, 2022

Related U.S. Application Data

(63) Continuation of application No. 17/745,310, filed on May 16, 2022, now Pat. No. 11,472,458.

(51) Int. Cl.
*B62B 3/02* (2006.01)
*B62B 3/04* (2006.01)
*B62B 3/10* (2006.01)

(52) U.S. Cl.
CPC .............. *B62B 3/02* (2013.01); *B62B 3/04* (2013.01); *B62B 3/104* (2013.01); *B62B 2202/80* (2013.01); *B62B 2203/74* (2013.01)

(58) Field of Classification Search
CPC ......... B62B 3/02; B62B 3/04; B62B 2202/80; B62B 2203/74; B62B 3/104
See application file for complete search history.

(56) References Cited

U.S. PATENT DOCUMENTS

| | | |
|---|---|---|
| 1,379,472 A | 5/1921 | Morgan et al. |
| 1,579,627 A | 4/1926 | Bell et al. |
| 1,641,985 A | 9/1927 | Nichols |
| 3,191,788 A | 3/1963 | Hopfeld |
| 3,112,835 A | 12/1963 | Gierhart |
| 4,213,727 A | 7/1980 | Lighthipe, Jr. |
| 5,044,690 A * | 9/1991 | Torrey ............... A47C 4/283 297/440.11 |
| 5,476,352 A | 12/1995 | Culbertson et al. |
| 6,394,736 B1 | 5/2002 | Derby et al. |
| 6,406,248 B1 | 6/2002 | McGill et al. |
| 7,740,251 B2 | 6/2010 | Simmons |
| 9,283,973 B1 | 3/2016 | Stone et al. |
| 10,214,228 B2 | 2/2019 | Benton et al. |
| 11,136,054 B1 | 10/2021 | Taylor et al. |
| 2002/0114689 A1 | 8/2002 | McGill et al. |
| 2005/0194804 A1 | 9/2005 | Isaacson, Jr. |

(Continued)

*Primary Examiner* — Jason D Shanske
*Assistant Examiner* — James J Triggs
(74) *Attorney, Agent, or Firm* — Michael W. Goltry; Robert A. Parsons; Parsons & Goltry, PLLC

(57) ABSTRACT

A framework includes axially spaced apart stands each including a front extremity and a rear extremity extending upright between an upper end and a lower end, the front extremities, the back extremities, the upper ends, and the lower ends defining the framework's front section, rear section, top, and ground-engaging bottom, respectively, and an axle and a rung intermediate the top and the bottom, the axle between the front section and the rear section and coupled between the stands and the rung coupled between the back extremities. A load-supporting roller carried by the axle intermediate the top and the bottom between the front section and the rear section is above the rung and configured to rotate. The framework defines a load-reception area open to the roller between the stands along the rear section from the rung to the top and along the front section from the top to below the roller.

16 Claims, 25 Drawing Sheets

(56) References Cited

U.S. PATENT DOCUMENTS

| | | |
|---|---|---|
| 2007/0292252 A1 | 12/2007 | McGill et al. |
| 2008/0048063 A1* | 2/2008 | Wells ................... B65H 54/205 242/557 |
| 2008/0129002 A1* | 6/2008 | Arnold ..................... B62B 3/02 280/42 |
| 2010/0327544 A1 | 12/2010 | Pebworth et al. |
| 2015/0203137 A1 | 7/2015 | Lang et al. |
| 2018/0251143 A1 | 9/2018 | Benton et al. |
| 2018/0319212 A1 | 11/2018 | Lindgren |
| 2018/0354403 A1 | 12/2018 | Strader |

\* cited by examiner

LOAD-HANDLING APPARATUS AND METHODS

FIELD OF THE INVENTION

The present invention relates to portable load-handling equipment configured to handle heavy and unwieldy loads not readily or easily manageable by hand.

BACKGROUND OF THE INVENTION

Hand trucks, any of various manually-operated load-handling frames or carts, are designed to handle heavy and unwieldy loads not readily or safely manageable by hand. Hand trucks of many types are customarily used to hold and transport loads short distances. However, conventional hand trucks are expensive, heavy, cumbersome, and interfere with load loading and offloading at loading and unloading areas. Given these and other deficiencies, there is a need in the art for a portable load-handling device that is inexpensive, non-motorized, easy to construct, easy to use without specialized skill, light in weight, does not require the use of tie-down straps, and built to enable safe and efficient load loading and offloading at loading and unloading areas.

SUMMARY OF THE INVENTION

In accordance with the invention, an apparatus for handling loads includes a framework including axially spaced apart stands each including a front extremity and a rear extremity extending upright between an upper end and a lower end, the front extremities, the back extremities, the upper ends, and the lower ends defining the framework's front section, rear section, top, and ground-engaging bottom, respectively, and an axle and a rung intermediate the top and the bottom, the axle between the front section and the rear section and coupled between the stands and the rung coupled between the back extremities at the rear section. A load-supporting roller carried by the axle intermediate the top and the bottom between the front section and the rear section is above the rung and configured to rotate. The framework defines a load-reception area open to the roller without interference between the stands along the rear section from the rung to the top and along the front section from the top to below the roller. The roller is centered between the stands and is a self-centering keel roller, a heavy-duty roller of rubber, polyvinyl, polyethylene, polyurethane, or the like. The keel roller includes a medial groove between inclined sections. The roller is configured to rotate relative to the axle. In a specific embodiment, the lower ends of the respective stands are wheeled. The lower ends of the respective stands are preferably wheeled by unidirectional wheels configured to restrain wheeled movement of the framework in opposite directions.

In accordance with the invention, an apparatus for handling loads includes a framework including axially spaced apart stands each including a front leg and a rear leg each having an upper end and a lower end, the upper ends attached and the front and rear legs extending downwardly to the lower ends from the upper ends, and a stay between the top and the bottom and coupled between the front leg and the rear leg securing the front leg at the rear leg at fixed positions relative to one another, the front legs, the rear legs, the upper ends, and the lower ends defining the framework's front section, rear section, top, and ground-engaging bottom, respectively, and an axle and a rung intermediate the top and the bottom, the axle between the front section and the rear section and coupled between the stays and the rung coupled between the rear legs. A load-supporting roller carried by the axle intermediate the top and the bottom between the front section and the rear section is above the rung and configured to rotate. The framework defines a load-reception area open to the roller without interference between the stands along the rear section from the rung to the top and along the front section from the top to below the roller. The roller is centered between the stands and is a self-centering keel roller, a heavy-duty roller of rubber, polyvinyl, polyethylene, polyurethane, or the like. The keel roller includes a medial groove between inclined sections. The roller is configured to rotate relative to the axle. The stays are each stiff, being rigid and not easily bent, and inarticulate and jointless having no articulation or joint. The upper ends of the respective stands are attached hingedly by respective hinges. The stays are mounted to the respective stands for movement between locked positions and unlocked positions, the stays in the locked positions concurrently securing the front leg and the rear leg of the respective stands at the fixed positions relative to one another. The front leg and the rear leg of the respective stands are enabled to displace pivotally at the respective hinges, when the stays are in the unlocked positions. In a specific embodiment, the lower ends of the respective stands are wheeled. The lower ends of the respective stands are preferably wheeled by unidirectional wheels configured to restrain wheeled movement of the framework in opposite directions.

In accordance with the invention, an apparatus for handling loads includes a ladder framework including axially spaced apart A-frames each including a front leg and a rear leg each having an upper end and a lower end, the upper ends attached and the front and rear legs extending downwardly to the lower ends from the upper ends, and a stay between the top and the bottom and coupled between the front leg and the rear leg securing the front leg at a fixed angle relative to the rear leg, the front legs, the rear legs, the upper ends, and the lower ends defining the ladder framework's front section, rear section, top, and ground-engaging bottom, respectively, and an axle and a rung intermediate the top and the bottom, the axle between the front section and the rear section and coupled between the stays and the rung coupled between the rear legs. A load-supporting roller carried by the axle intermediate the top and the bottom between the front section and the rear section is above the rung and configured to rotate. The ladder framework is obstructionless, being without any rung, step, stay, or other obstruction between the A-frames, from the axle and the roller to the top and along the rear section from the rung to the top and along the front section from the top to below the roller, defining a load-reception area open to the roller without interference between the A-frames, from the axle and the roller to the top and along the rear section from the rung to the top and along the front section from the top to below the roller. The roller is centered between the A-frames and is a self-centering keel roller, a heavy-duty roller of rubber, polyvinyl, polyethylene, polyurethane, or the like. The keel roller includes a medial groove between inclined sections. The roller is configured to rotate relative to the axle. The stays are each stiff, being rigid and not easily bent, and inarticulate and jointless having no articulation or joint. The upper ends of the respective A-frames are attached hingedly by respective hinges. The stays are mounted to the respective A-frames for movement between locked positions and unlocked positions, the stays in the locked positions concurrently securing the front leg and the rear leg of the respective A-frames at the fixed positions relative to one another. The front leg and the rear leg of the respective A-frames are enabled to displace pivotally at the respective hinges, when the stays are in the unlocked positions. In a specific embodiment, the lower ends of the respective A-frames are wheeled. The lower ends of the respective A-frames are preferably wheeled by unidirectional wheels configured to restrain wheeled movement of the ladder framework in opposite directions.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Figure 1:
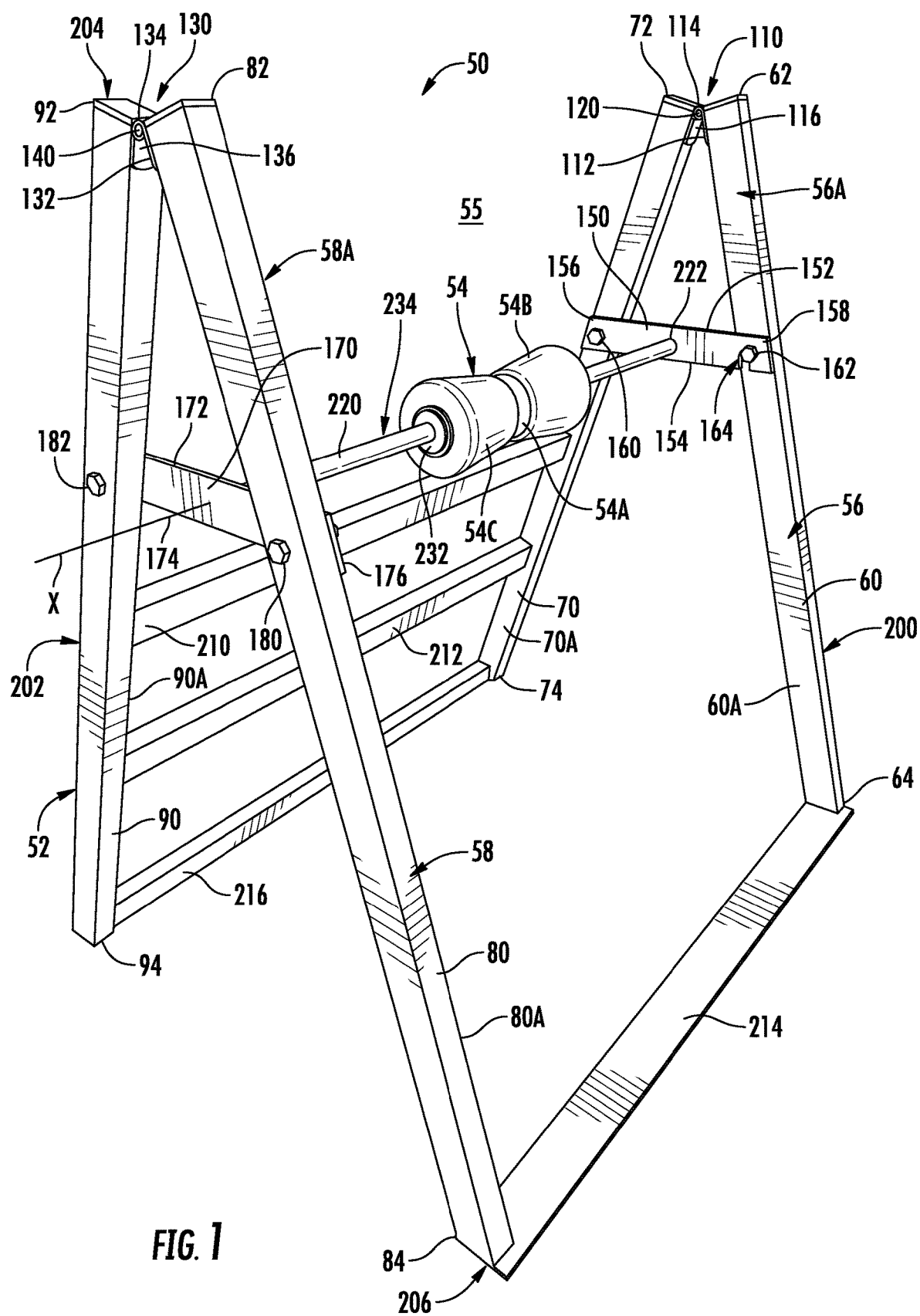
FIG. 1 is a right front perspective view a portable load-handling apparatus constructed and arranged in accordance with the invention.
Figure 2:
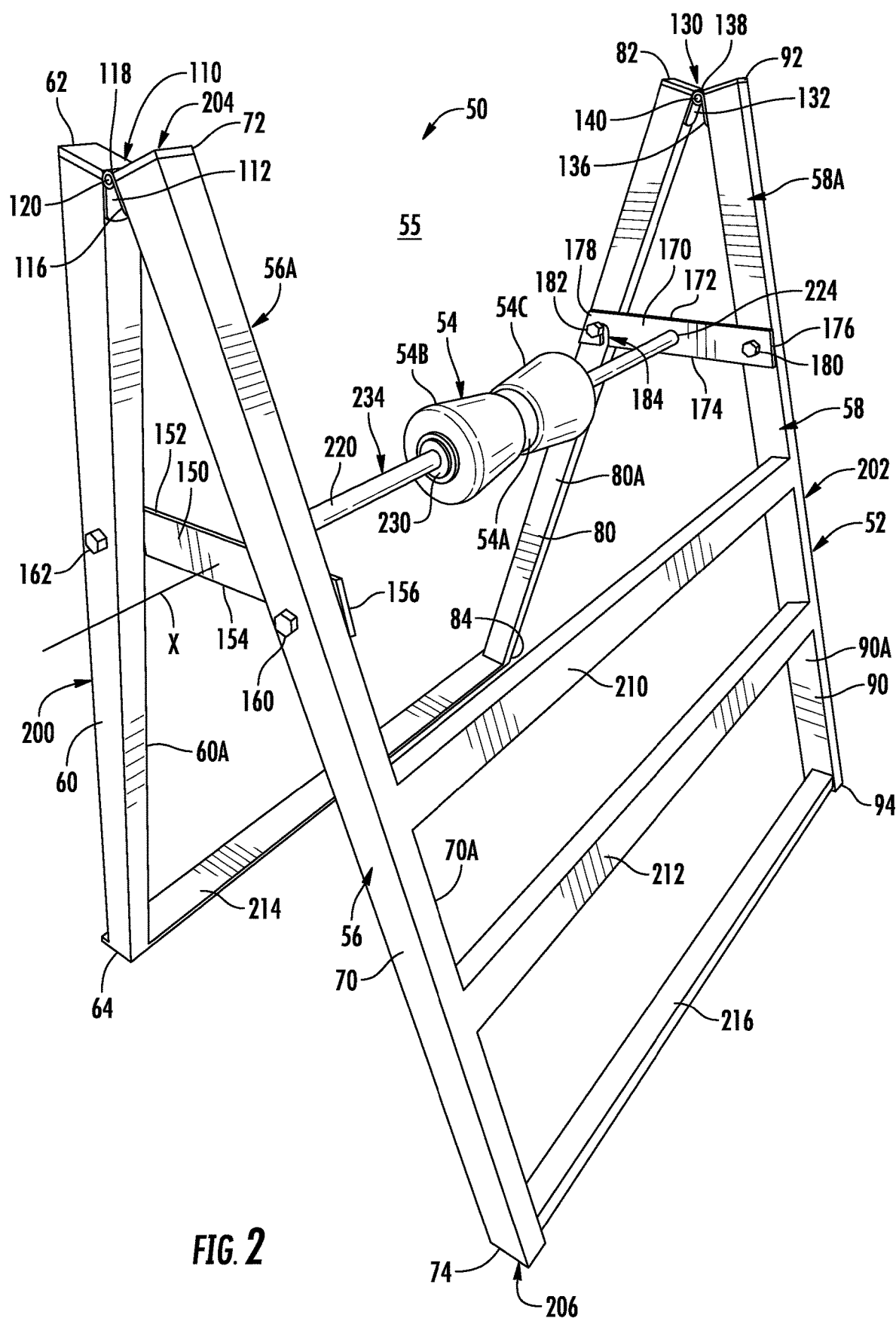
FIG. 2 is a left rear perspective view of the embodiment of FIG. 1.
Figure 3:
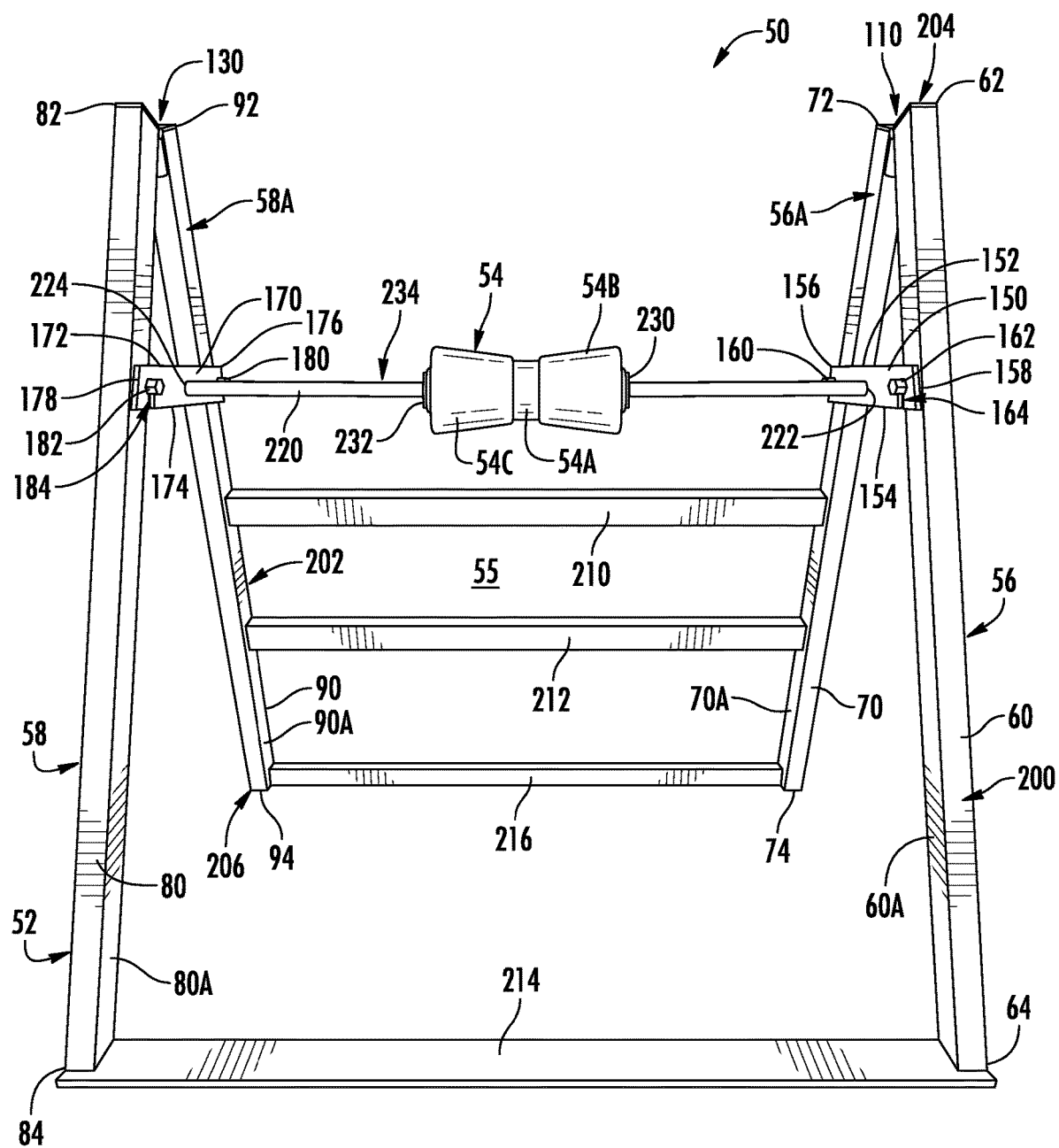
FIG. 3 is a front perspective view of the embodiment of FIG. 1.
Figure 4:
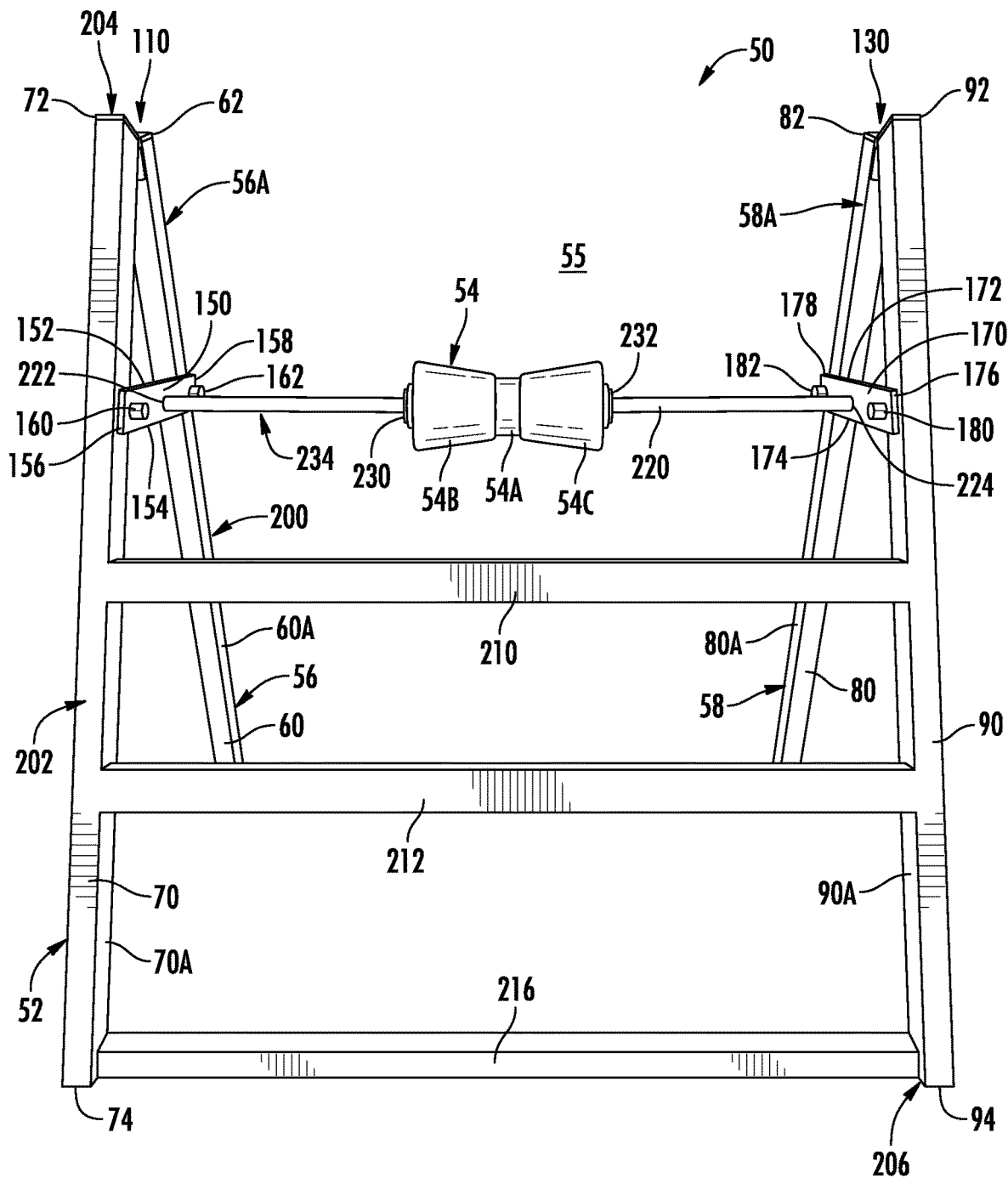
FIG. 4 is rear perspective view of the embodiment of FIG. 1.
Figure 5:
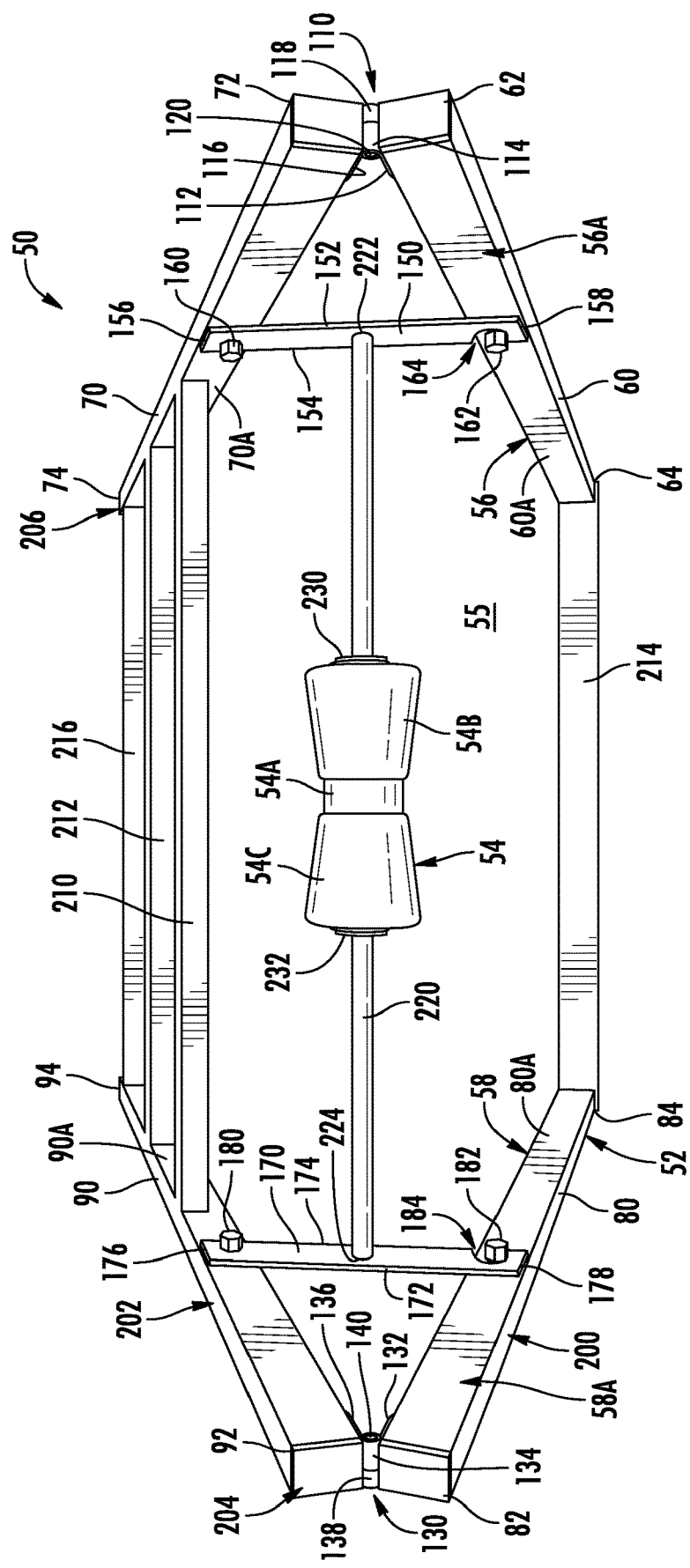
FIG. 5 is a top view of the embodiment of FIG. 1.

Disclosed are load-handling apparatus and methods.

Referring in relevant part to FIGS. 1-5, illustrated is a load-handling apparatus 50 that is strong, light in weight, approximately 20-25 pounds in weight, portable, self-contained, and easily transported and conveyed. Apparatus 50 includes an upright framework 52 that supports a rotating load-bearing roller 54 at an elevated location in a load-reception area 55. Roller 54 is configured to receive a load, such as a water heater, a refrigerator, a water softener, or the like, support the load thereover at an elevated location in the load-reception area 55 when it is pulled up and over the roller 54 by a user, and enable the user to translate the roller-supported load back and forth over the roller 54 through the load-reception area 55 without interference to maneuver, position, and deposit the load safely and securely at a chosen location, the roller 54 configured to rotate under the load in opposite directions in response.

Framework 52 is strong and rugged and of steel, aluminum, or other metal, material, or combination of materials having inherently strong, rigid, and resilient material characteristics. Framework 52 includes connected, mutually upright stands 56 and 58 that are axially spaced apart and aligned. The stand 56 has front and rear legs 60 and 70, and the stand 58 has front and rear legs 80 and 90. Legs 60, 70, 80, and 90 are elongate and coextensive, being identical in size and shape, and built of generally square, tubular stock, being inherently light in weight and strong. Front legs 60 and 80 at the framework's 52 front section are mutually upright and parallel to one another, and rear legs 70 and 90 at the framework's 52 rear section are mutually upright and parallel. The stand's 56 front leg 60 includes upper and lower ends 62 and 64 and is longitudinally straight from the upper end 62 to the lower end 64. Like its front leg 60, the stand's 56 rear leg 70 includes upper and lower ends 72 and 74 and is longitudinally straight from the upper end 72 to the lower end 74. The stand's 58 front leg 80 includes upper and lower ends 82 and 84 and is longitudinally straight from the upper end 82 to the lower end 84. Like its front leg 80, the stand's 58 rear leg 90 includes upper and lower ends 92 and 94 and is longitudinally straight from the upper end 92 to the lower end 94.

A hinge 110 attaches the upper end 62 of the stand's 56 front leg 60 to the upper end 72 of the stand's 56 rear leg 70 pivotally. The hinge 110, a standard hinge coupled between the upper ends 62 and 72, includes juxtaposed plates, including a first or front plate 112 affixed exteriorly to the front leg 60 proximate to its upper end 62 by welding or suitable fasteners, and a second or rear plate 116 affixed exteriorly to the rear leg 70 proximate to its upper end 72 by welding or suitable fasteners. The first plate 112 has a generally cylindrical member 114 axially aligned with a generally cylindrical member 118 of the second plate 116. A pin 120 extends through the cylindrical members 116 and 118 disposed between the upper ends 62 and 72, connecting the first plate 112 to the second plate 116 pivotally, connecting the upper end 62 of the stand's 56 front leg 62 to the upper end 72 of the stand's 56 rear leg 70 hingedly. Other suitable hinge formats can be used to connect the upper ends 62 and 72 hingedly.

A hinge 130 attaches the upper end 82 of the stand's 58 front leg 80 to the upper end 92 of the stand's 58 rear leg 90 pivotally. The hinge 130, a standard hinge coupled between the upper ends 82 and 92, includes juxtaposed plates, including a first plate 132 affixed to the front leg 80 proximate to its upper end 82 by welding or suitable fasteners, and a second plate 136 affixed to the rear leg 90 proximate to its upper end 92 by welding or suitable fasteners. The first plate 132 has a generally cylindrical member 134 axially aligned with a generally cylindrical member 138 of the second plate 136. A pin 140 extends through the cylindrical members 136 and 138 disposed between the upper ends 82 and 92, connecting the first plate 132 to the second plate 136 pivotally, connecting the upper end 82 of the stand's 58 front leg 82 to the upper end 92 of the stand's 58 rear leg 90 hingedly. Other suitable hinge formats can be used to connect the upper ends 62 and 72 hingedly.

Stand's 56 and 58 are identical A-frames. Stand's 56 front and rear legs 60 and 70 extend downwardly and angularly outwardly from one another from their hingedly attached upper ends 62 and 72 at the stand's 56 top to their ground-engaging lower ends 64 and 74 at the stand's 56 bottom, the stand 56 having an A-frame shape. Stand's 58 front and rear legs 80 and 90 likewise extend downwardly and angularly outwardly from one another from their hingedly attached upper ends 82 and 92 at the stand's 58 top to their ground-engaging lower ends 84 and 94 at the stand's 58 bottom, the stand 58 having an A-frame shape identical to the stand 56.

A stay 150 coupled between stand's 56 front and rear legs 60 and 70 secures them in their open configuration, their A-frame configuration, by securing the front and rear legs 60 and 70 at fixed positions relative to one another. Identically, a stay 170 coupled between stand's 58 front and rear legs 80 and 90 secures them in their open configuration, their A-frame configuration, by securing the front and rear legs 80 and 90 at fixed positions relative to one another. Each of the stays 150 and 170 is inherently stiff, rigid, strong, not easily bent, and inarticulate and jointless, having no articulation or joint.

The stay 150 extends across the inner sides 60A and 70A of the stand's 56 respective front and rear legs 60 and 70, and the stay 170 extends along the inner sides 80A and 90A of the stand's 58 respective front and rear legs 80 and 90. The stays 150 and 170 between the stands 56 and 58 oppose one another and are mutually parallel and axially spaced apart and aligned.

Preferably, the stays 150 and 170 are mounted to the respective frames 56 and 58 for movement between locked and unlocked positions. FIGS. 1-5 show stays 150 and 170 in their locked positions, concurrently securing the respective stands 56 and 58 in their open A-frame configurations. The front legs 60 and 80 are enabled to displace pivotally out of their respective fixed positions relative to the respective rear legs 70 and 90 at the respective hinges 110 and 130 when the stays 150 and 170 are in their unlocked positions.

The stand's 56 stay 150 is an elongate piece of flat bar stock, including upper and lower edges 152 and 154 extending between an inner or proximal end 156 and an opposed outer or distal end 158. The stay 150 is longitudinally straight from the proximal end 156 to the distal end 158. The stay 150 extends longitudinally across the stand 56 from the proximal end 156 connected to the rear leg 70 between its upper and lower ends 72 and 74 to the distal end 158 connected to the front leg 60 between its upper and lower ends 62 and 64, securing the front and rear legs 60 and 70 in their fixed, angular positions relative to each other defining the stand's 56 open A-frame configuration. The stay 150 extends along the inner sides 60A and 70A of the respective front and rear legs 60 and 70 from its proximal end 156 connected to the rear leg 70 to its distal end 158 connected to the front leg 60.

The stay's 150 proximal end 156 is coupled to the rear leg 70 releasably and pivotally, and the stay's 150 distal end 158 is locked or otherwise coupled releasably to the front leg 60, securing the front and rear legs 60 and 70 at their fixed positions relative to one another. A pivot pin, a fastener 160 in this example, connects the stay's 150 proximal end 156 to the rear leg 70 along its inner side 70A releasably and pivotally. The fastener 160 is a nut-and-bolt assembly applied through appropriate holes in the rear leg 70 and the stay's 150 proximal end 156.

Figure 6:
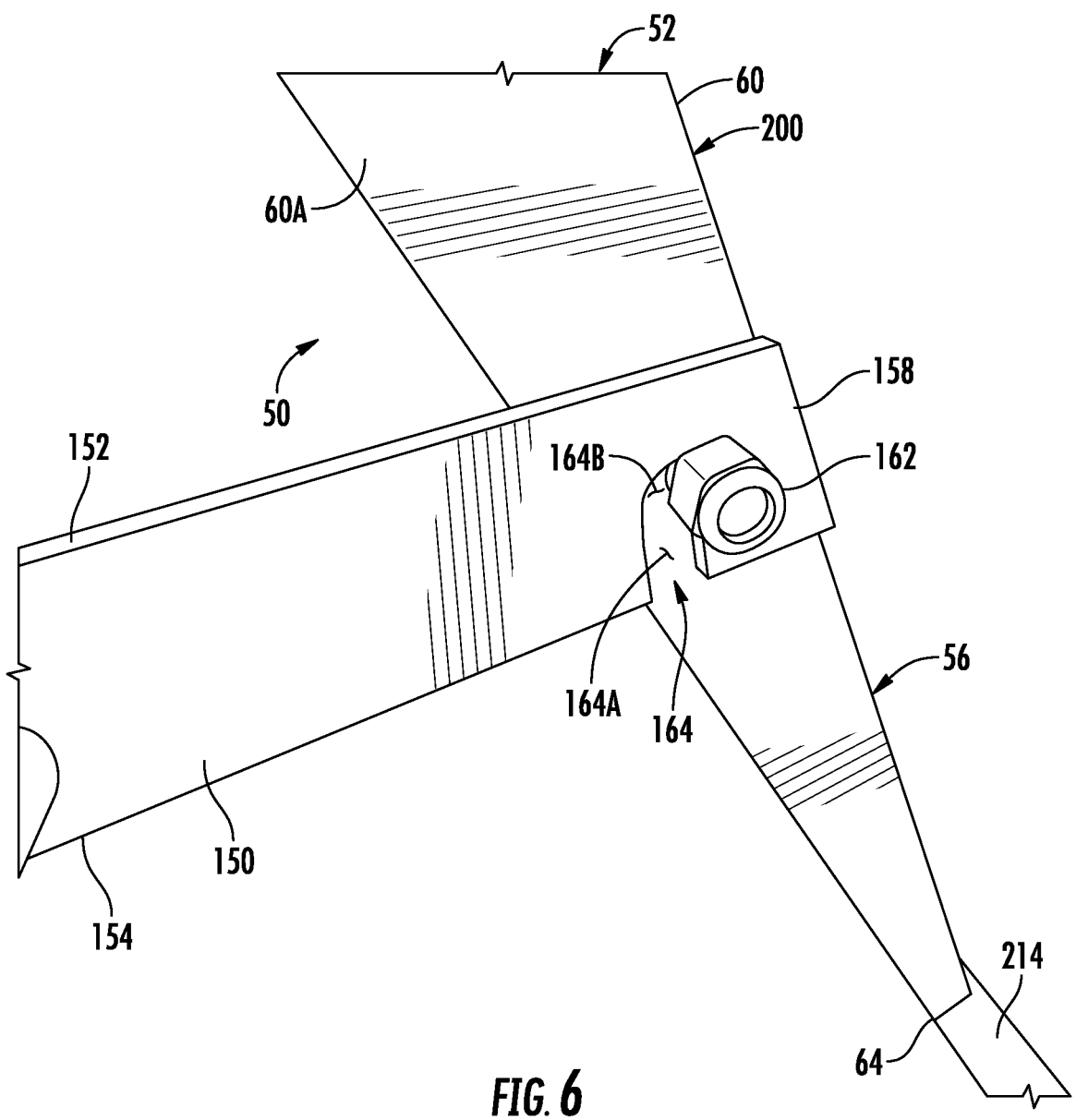
FIG. 6 is an enlarged, fragmentary view of the embodiment of FIG. 1.
Figure 18:
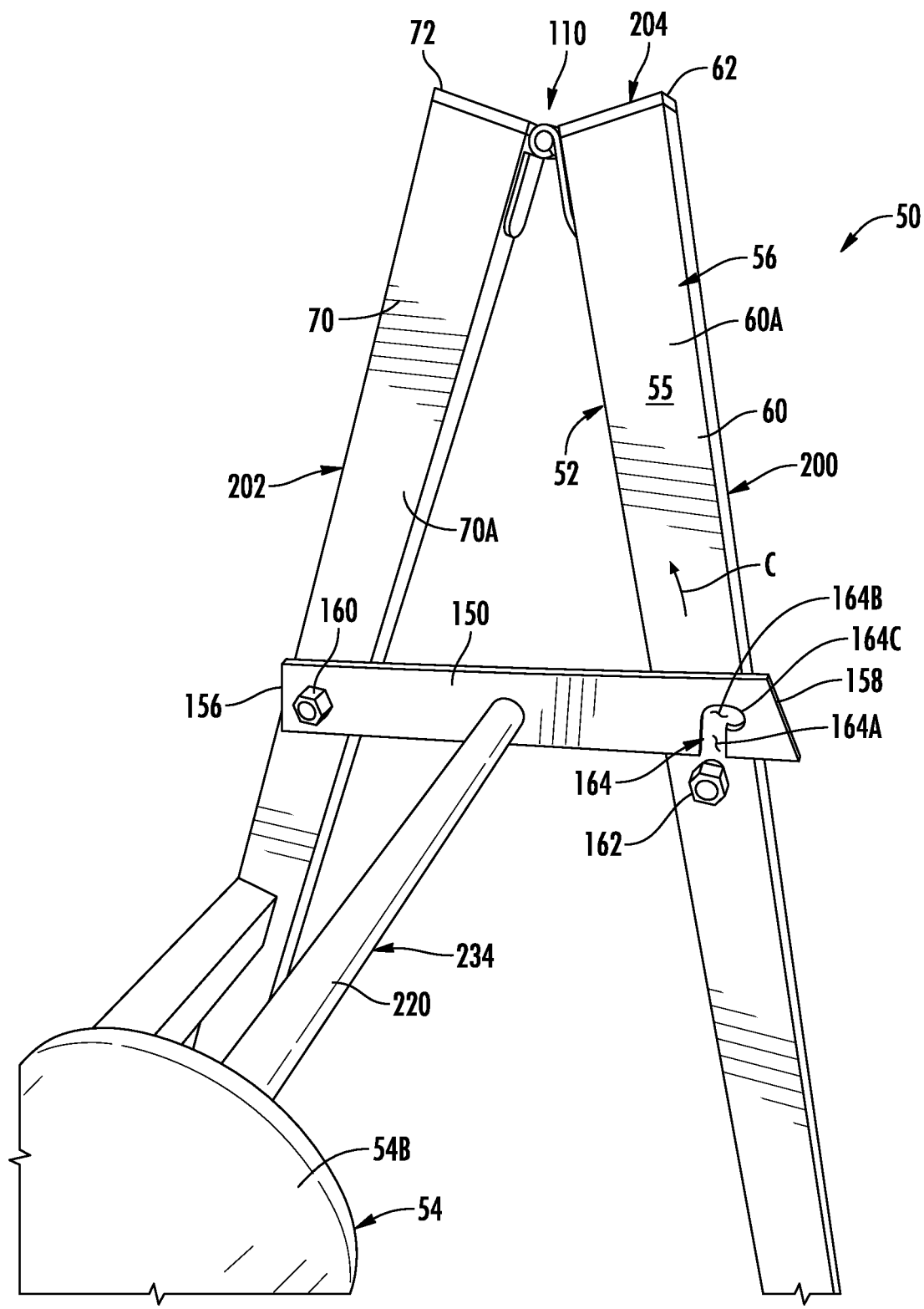

In FIG. 6, a hook shape of the stay's 150 distal end 158 hooked releasably over a headed pin 162 carried by the front leg 60 and extending inwardly from the front leg's 60 inner side 60A couples the stay's 150 distal end 158 to the front leg 60 along its inner side 60A releasably. In this example, the headed pin 162 is a nut-and-bolt fastener applied through appropriate holes in the front leg 60. A hook-shaped slot 164 formed in the stay's 150 distal end 158 defines the distal end's 158 hook shape. In FIG. 18, the slot 164 includes a proximal slot component 164A and a hooked or distal slot component 164B. The proximal slot component 164A extends upright into the stay 150 from the lower edge 154 to the distal slot component 164B. The distal slot component 164B between the upper and lower edges 152 and 154 extends laterally from the proximal slot component 164A toward the stay's distal end 158 to the distal slot component's 164B closed end 164C. In FIG. 6, the slot 164 fitted over the pin 162 positioned in the distal slot component 164B against its closed end 164C releasably secures the stay's 150 distal end 158 to the stand's 56 front leg 60.

Identically to the stand's 56 stay 150, the stand's 58 stay 170 is an elongate piece of flat bar stock, including upper and lower edges 172 and 174 extending between an inner or proximal end 176 and an opposed outer or distal end 178. The stay 170 is longitudinally straight from its proximal end 176 to its distal end 178. The stay 170 extends longitudinally across the stand 58 from the proximal end 176 connected to the rear leg 90 between its upper and lower ends 92 and 94 to the distal end 174 connected to the front leg 80 between its upper and lower ends 82 and 84, securing the front and rear legs 80 and 90 in their fixed, angular positions relative to one another defining the stand's 58 open A-frame configuration. The stay 170 extends along the inner sides of the respective front and rear legs 80 and 90 from its proximal end 176 connected to the rear leg 90 to its distal end 178 connected to the front leg 80.

The stay's 170 proximal end 176 is coupled to the rear leg 90 releasably and pivotally, and the stay's 170 distal end 178 is locked or otherwise coupled releasably to the front leg 80, securing the front and rear legs 80 and 90 at their fixed positions relative to one another. A pivot pin, a fastener 180 in this example, connects the stay's 170 proximal end 176 to the rear leg 90 along its inner side 90A releasably and pivotally. The fastener 180 is a nut-and-bolt assembly applied through appropriate holes in the rear leg 90 and the stay's 170 proximal end 176.

Figure 7:
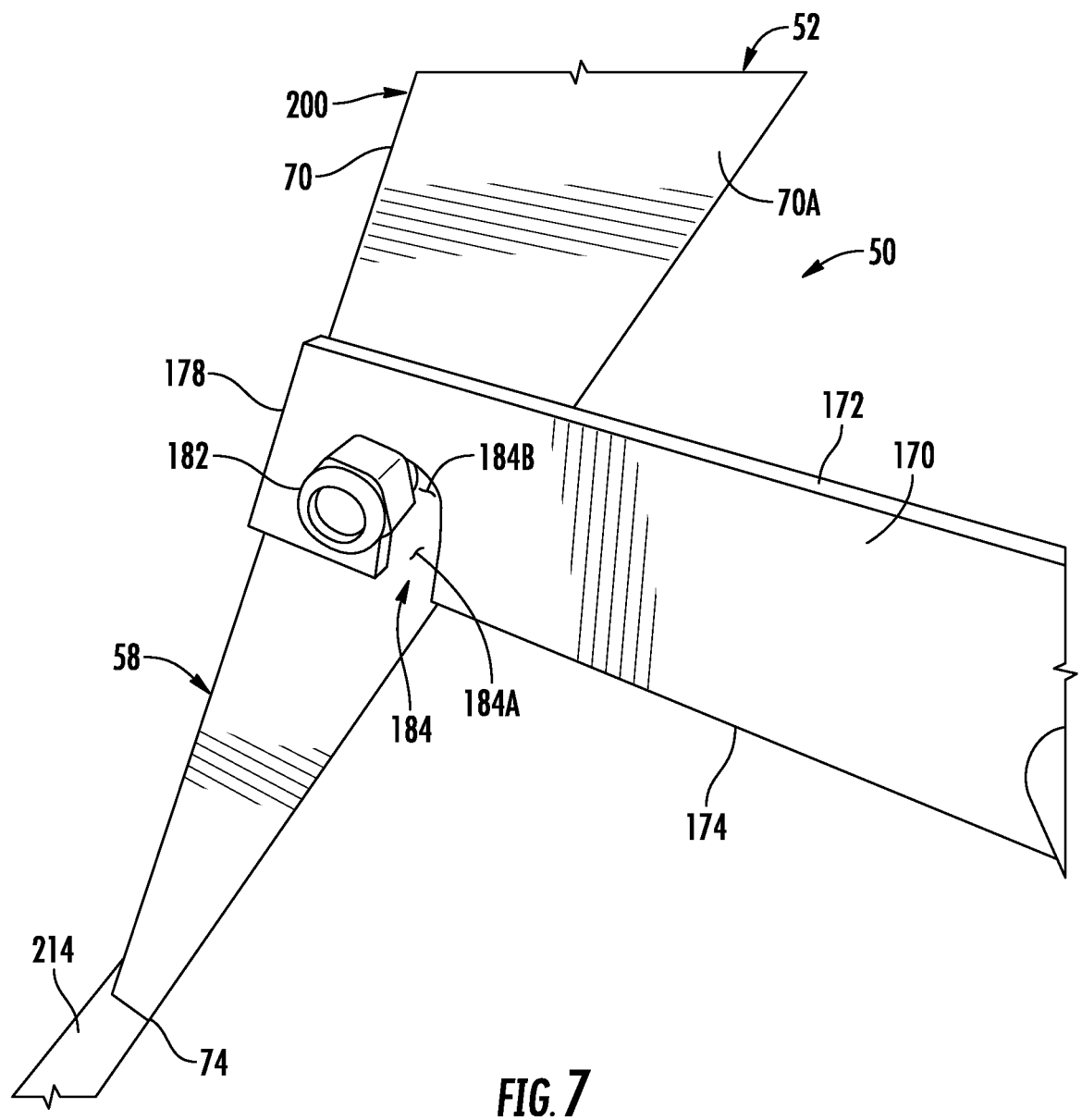
FIG. 7 is an enlarged, fragmentary view of the embodiment of FIG. 2.
Figure 19:
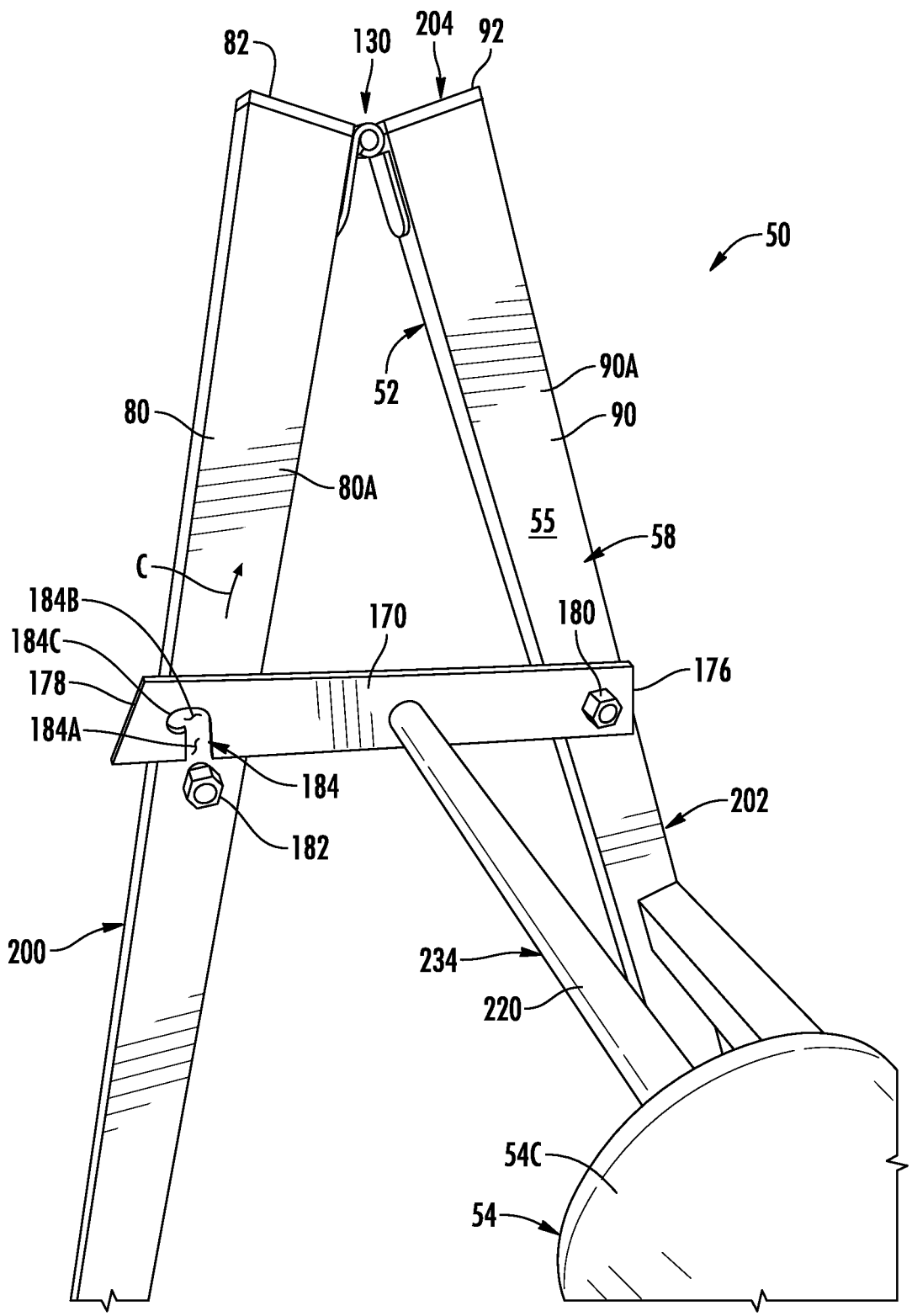

In FIG. 7, a hook shape of the stay's 170 distal end 178 hooked releasably over a headed pin 182 carried by the front leg 80 and extending inwardly from the front leg's 80 inner side 80A couples the stay's 170 distal end 178 to the front leg 80 along its inner side 80A releasably. In this example, the headed pin 182 is a nut-and-bolt fastener applied through appropriate holes in the front leg 80. A hook-shaped slot 184 formed in the stay's 170 distal end 178 defines the distal end's 178 hook shape. In FIG. 19, the slot 184 includes a proximal slot component 184A and a hooked or distal slot component 184B. The proximal slot component 184A extends upright into the stay 170 from the lower edge 174 to the distal slot component 184B. The distal slot component 184B between the upper and lower edges 172 and 174 extends laterally from the proximal slot component 184A toward the stay's distal end 178 to the distal slot component's 184B closed end 184C. In FIG. 7, the slot 184 fitted over the pin 182 positioned in the distal slot component 184B against its closed end 184C releasably secures the stay's 170 distal end 178 to the stand's 58 front leg 80.

In FIGS. 1-5, the axially spaced apart and mutually parallel front legs 60 and 80 define the framework's 52 front section 200. The axially spaced apart and mutually parallel rear legs 70 and 90 define the framework's 52 rear section 202. The upper ends 62, 72, 82, and 84 define the framework's top 204, and the lower ends 64, 74, 84, and 94 define the framework's 52 ground-engaging bottom 206. The framework 52 has a height of approximately three feet from its bottom 206 to its top 204, and a length of approximately two and one-half feet from the framework's 52 bottom 206 at the front section 200 to the framework's 52 bottom 206 at the rear section 202. The framework's 52 width from stand 56 to stand 58 at either side of the framework 52 is approximately thirty inches. These dimensions are variable as desired, consistent with the teachings throughout this specification.

The framework 52 additionally includes rungs 210 and 212, stays 214 and 216, and an axle 220, extending concurrently across the framework 52 from stand 56 to stand 58 at either side of the framework 52, connecting the stands 56 and 58. Since the stays 150 and 170 secure stands 56 and 58 in their identical open A-frame configurations in FIGS. 105, framework 52 is a ladder framework, an open A-frame formed by connected A-frames, stands 56 and 58.

The rungs 210 and 212 are parallel and vertically spaced apart along the framework's 52 rear section 202 between the framework's 52 top 204 and bottom 206. The rungs 210 and 212 connecting the rear legs 80 and 90 extend along vertically spaced apart flat planes and are coupled between the rear legs 70 and 90 between the rear leg's 70 upper and lower ends 72 and 74 and between the rear leg's 90 upper and lower ends 92 and 94. The stay 214 extending along a flat plane at the framework's 52 front section 200 connects the lower ends 64 and 84 of the framework's 52 respective front legs 60 and 70, reinforcing them and preventing them from spreading apart. In this example, the stay 214 is a ground-engaging component of the framework 52 and is a part or otherwise an extension of the ground-engaging lower ends 64 and 84 of the respective front legs 60 and 80. The stay 216 parallel to the rungs 210 and 212 extending along a flat plane at the framework's 52 rear section 202 connects the lower ends 74 and 94 of the framework's 52 respective rear legs 70 and 90, reinforcing them and preventing them from spreading apart.

The axle 220 supports roller 54 configured to support loads and to rotate. The axle 220 is inherently stiff, rigid, and not easily bent, and inarticulate and jointless, having no articulation or joint. The axle 220, the roller's 54 strong and rugged support, an elongate piece of round bar stock, is connected between stays 150 and 170. The axle 220 is parallel to the framework's 42 top 204 and bottom 206, extends across the framework 52 from stand 56 to stand 58, from the stay 150 to the stay 170, and is between the framework's 52 front and rear sections 200 and 202 and intermediate the framework's top 204 and bottom 206. The axle 220 is longitudinally and horizontally straight across the framework 52 from its first end 222, rigidly affixed, such as by welding, to the stay 150 centrally between the stay's 150 proximal and distal ends 156 and 158 between the stand's 56 front and rear legs 60 and 70, to its second end 224, rigidly affixed, such as by welding, to the stay 170 centrally between its proximal and distal ends 176 and 178 between the stand's 58 front and rear legs 80 and 90.

The rear section's 202 rung 210 between the top 204 and the bottom 206 of the framework 52 is the uppermost rung of the rear section 202. The rung 210 is below the axle 220 and its roller 54. The rear section's 202 rung 212 between the rung 210 and the frameworks stay 216 connecting the lower ends 74 and 94 at the framework's 52 bottom 206 is the lowermost rung of the rear section 202 below rung 210. The rungs 210 and 212 are each useful for stepping on by foot for bracing the stand 52 situated upright on the ground from the bottom 206 to the top 204 while he stands on the ground with his other foot. Framework's 52 rear section 202 has two vertically spaced apart rungs 210 and 212. The rear section 202 can have less or more rungs, provided the uppermost rung is below the axle 220 and the roller 54 it supports, preventing it from interfering with loads when handled by apparatus 50 as described herein.

The axle 220 supports the roller 54 centrally between the stands 56 and 58 between the framework's 52 top 204 and bottom 206. The roller 54, centered between the stays 150 and 170 and flanked on either side by the respective stands 56 and 58, is between the framework's 52 front and rear sections 202 intermediate the framework's 52 top 204 and bottom 206 and above the rung 210. Load-confinement sections 56A and 58A of the respective stands extend upright from roller 54 to top 204. The axle 220 extends through the roller 54. The roller 54 rotates freely over the axle 220 about an axis X of rotation in FIGS. 1 and 2 about which the axle 220 and the roller 54 are concurrently arranged, the axis X parallel relative to the framework's 52 top 204 and bottom 206 and perpendicular relative to the stands 56 and 58 and their respective stays 150 and 170. Annular washers 230 and 232 affixed to the axle 220 at fixed positions by welding or other suitable technique on either side of the roller 54 captively retain the roller 54 centrally to the axle 220.

Figure 8:
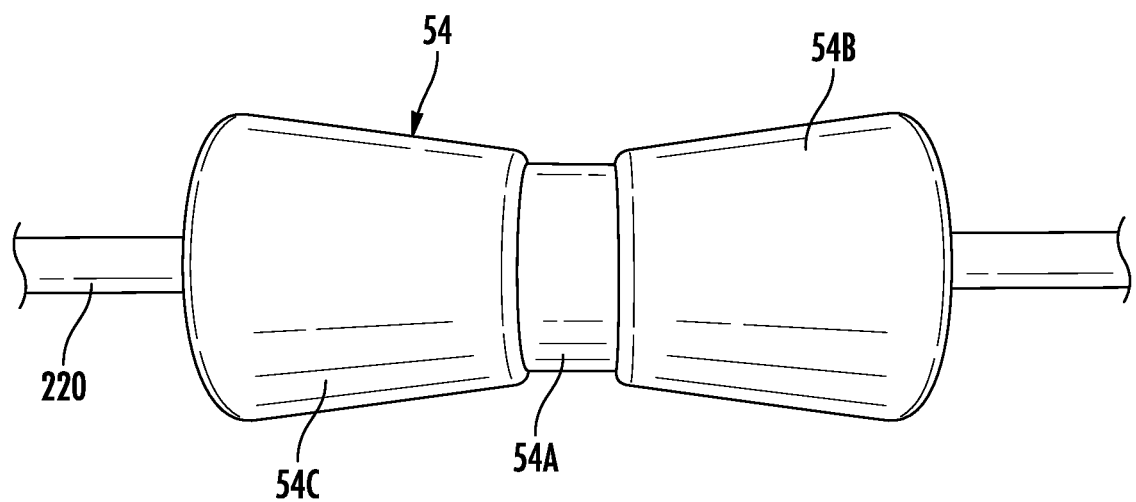
FIG. 8 is a front elevation view of a load-supporting roller of the embodiment of FIG. 1.
Figure 9:
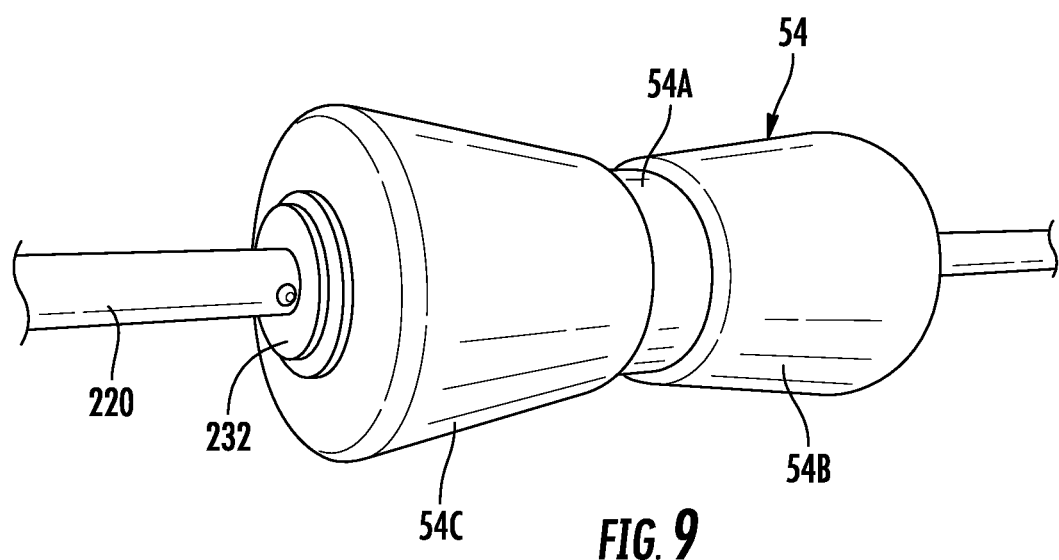
FIG. 9 is a right side perspective view of the embodiment of FIG. 8.
Figure 10:
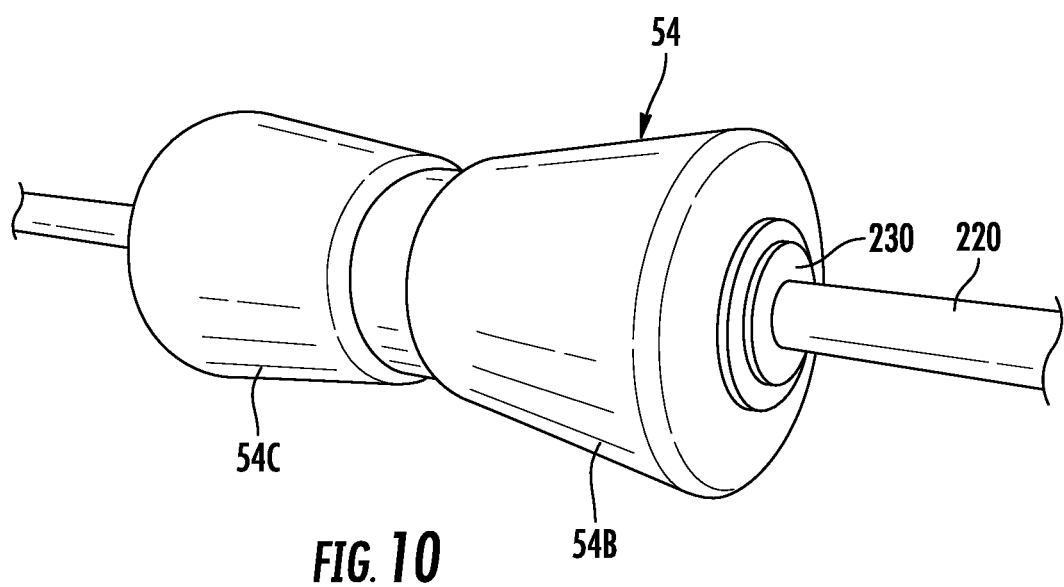
FIG. 10 is a left side elevation view of the embodiment of FIG. 8.

In FIGS. 8-10, the roller 54 is a self-centering keel roller, a standard and readily-available heavy-duty roller of rubber, polyvinyl, polyethylene, polyurethane, or the like, configured to self-center loads applied thereover. The material of the roller 54 is long-lasting, absorbs shock, is cut-resistant, and will not mark or mar the loads it receives and supports. In this example, roller 54 includes a medial groove or waist 54A between inclined sections 54B and 54C. The inclined sections 54B and 54C, frustoconical sections, taper inwardly toward the medial groove or waist 54A of comparatively reduced diameter. The washers 230 and 232 on either side of the respective inclined sections 54B and 54C captively retain the roller 54 on the axle 220. The assembly of stays 150 and 170 and roller 54 supported by axle 220 connected between stays 150 and 170 define a roller assembly, generally denoted at 234 in FIGS. 1-5. mike Apart from the axle 220 and the roller 54 it carries, framework 52 is rungless, stepless, and stayless, namely, obstructionless, meaning that that framework 52 is without any rung, step, stay, or other obstruction between or otherwise extending between the stands 56 and 58, between the rear legs 70 and 90 of rear section 202, from the uppermost rung 210 below the axle 220 and the roller 54 it carries to the top 204, and between the front legs 60 and 80 of front section 200, from the top 204 to below the axle 220 and the roller 54 it carries and, in this embodiment, to the front section's 200 ground-engaging bottom defined by stay 214 connecting lower ends 64 and 84 of the respective front legs 60 and 80. In other words, the obstructionless attribute of the framework 52 according to this disclosure means that framework 52 is without any rung, step, stay, or other obstruction between or otherwise extending between the stands 56 and 58, the A-frames, between the load-confinement sections 56A and 58A, from the axle 220 and the roller 54 it carries to the top 204 and to the front section 200 and the rear section 202 from below the axle 220 and the roller 54 it carries to the top 204, in this embodiment from the uppermost rung 210 to the top 204 and from the top 204 to below the axle 220 and the roller 54 it carries to the front section's 200 ground-engaging bottom defined by stay 214 connecting lower ends 64 and 84 of the respective front legs 60 and 80. This defines the load-reception area 55 of the apparatus 50 that is entirely open outwardly from the framework 52 and inwardly to the roller 54 between the stands 56 and 58 without any interference or obstruction between the stands 56 and 58, the A-frames, between the load-confinement sections 56A and 58A, from the axle 220 and the roller 54 it carries to the top 204 and to the front section 200 and the rear section 202 from below the axle 220 and the roller 54 it carries to the top 204, in this embodiment along the rear section 202 from the rung 210 to the top 204 and along the front section 200 from the top 204 to below the axle 220 and the roller 54 it carries to the ground-engaging bottom of the front section 200 defined by the stay 214 connecting the lower ends 64 and 84 of the respective front legs 60 and 80, enabling the load-reception area 55, open outwardly without interference from the framework 52 and the roller 54 it supports, to accept a load atop the roller 54 as described herein.

Figure 11:
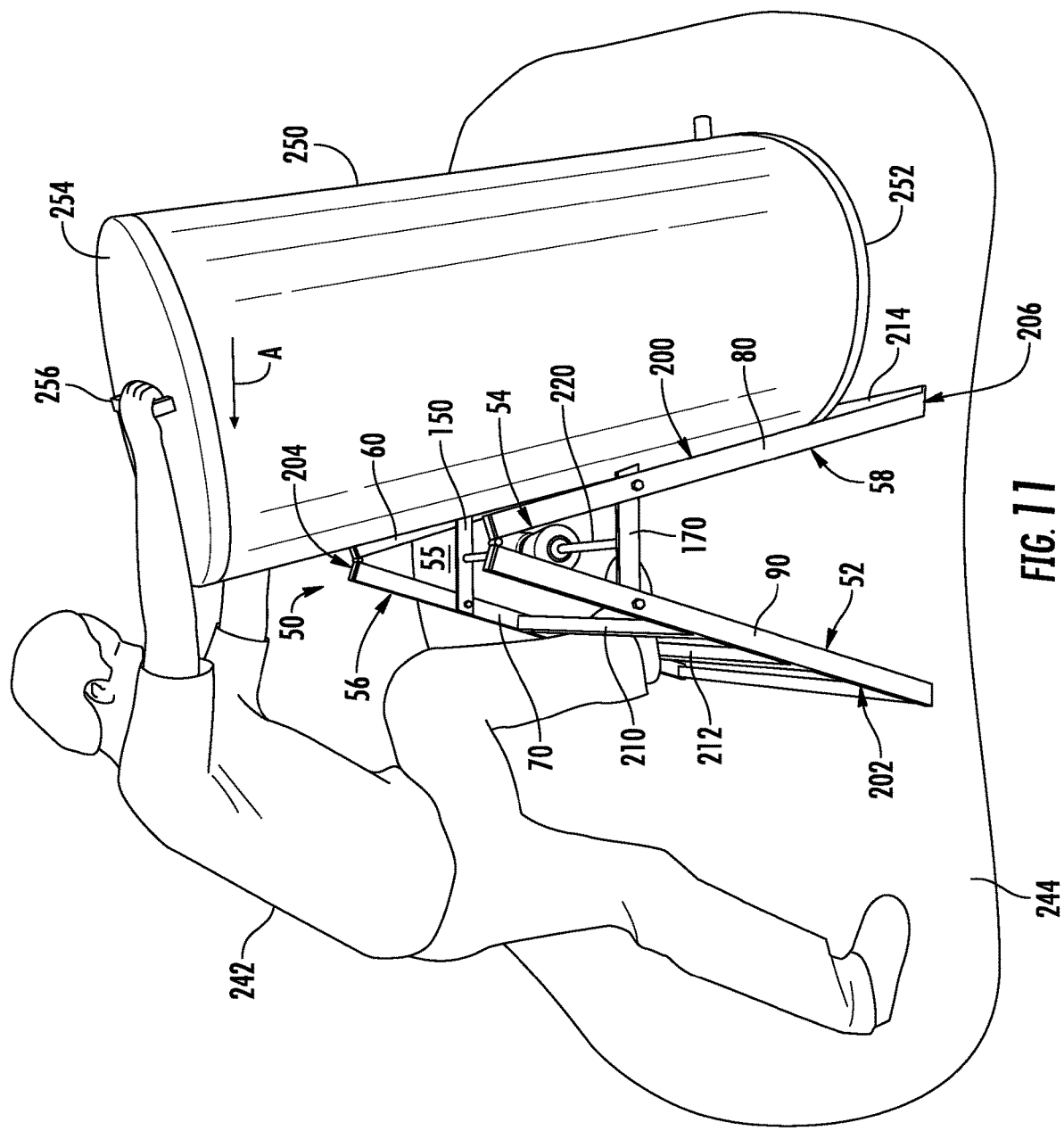
FIGS. 11-15 illustrate a sequence of steps of handling a load with the embodiment of FIG. 1.
Figure 12:
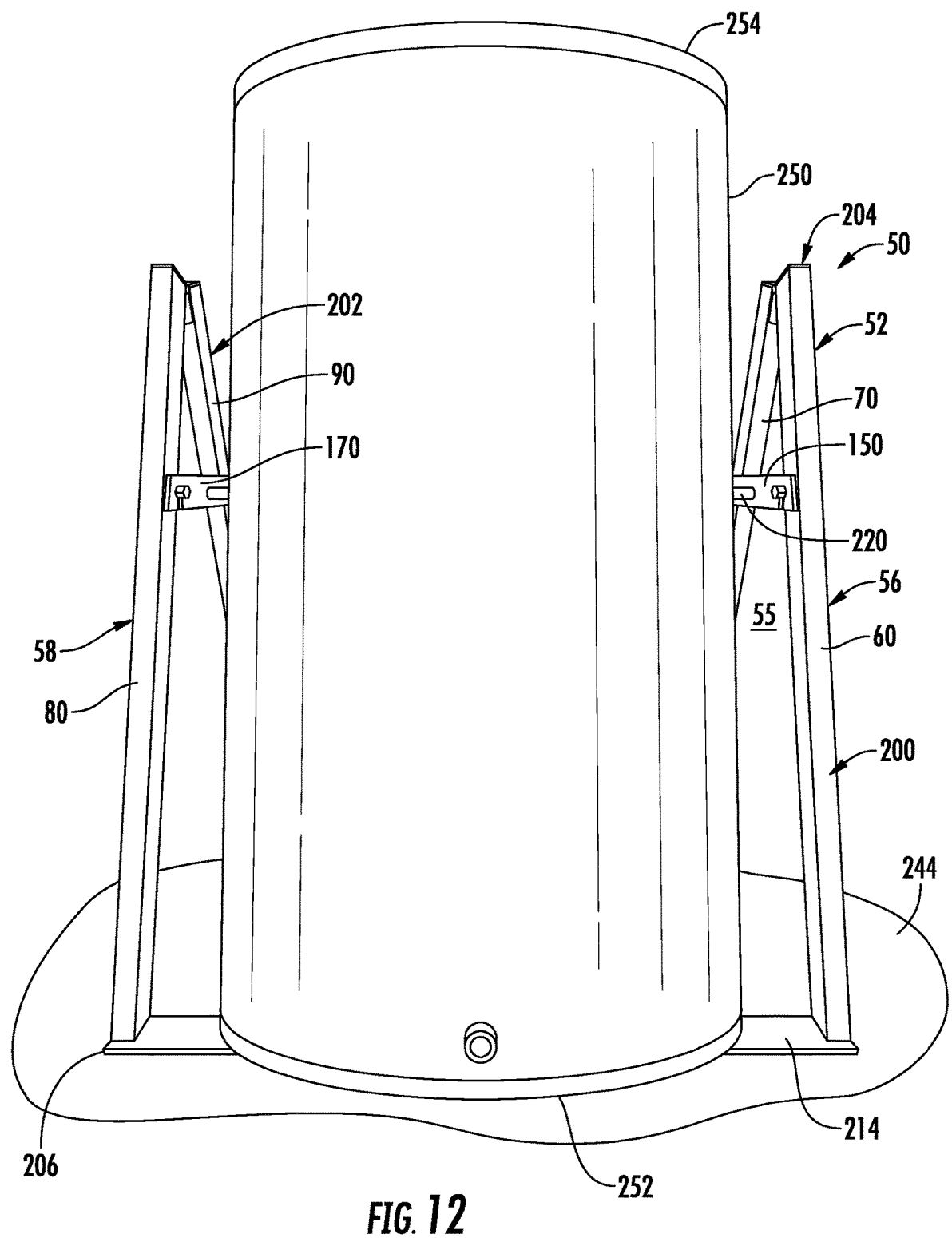
Figure 13:
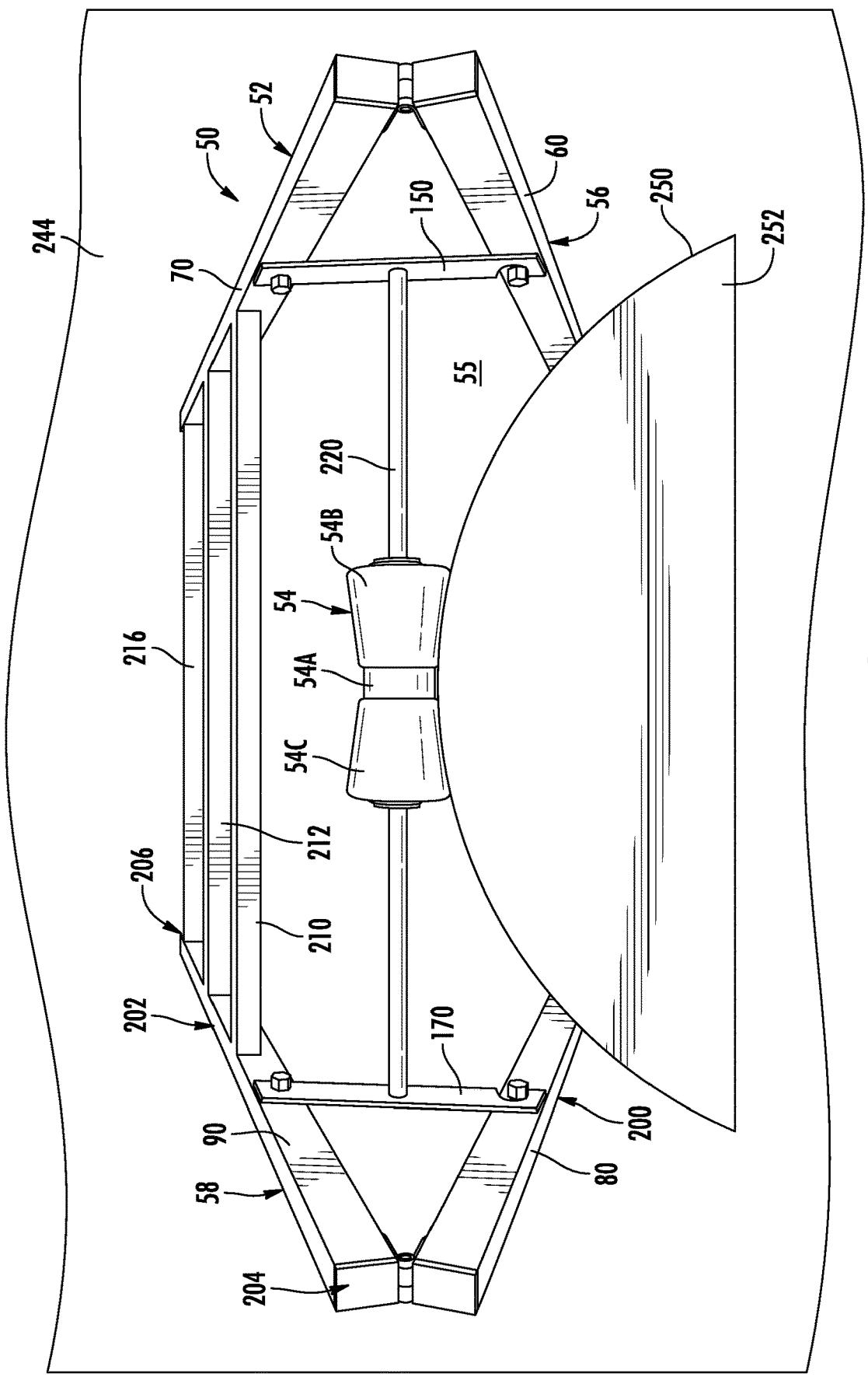
Figure 14:
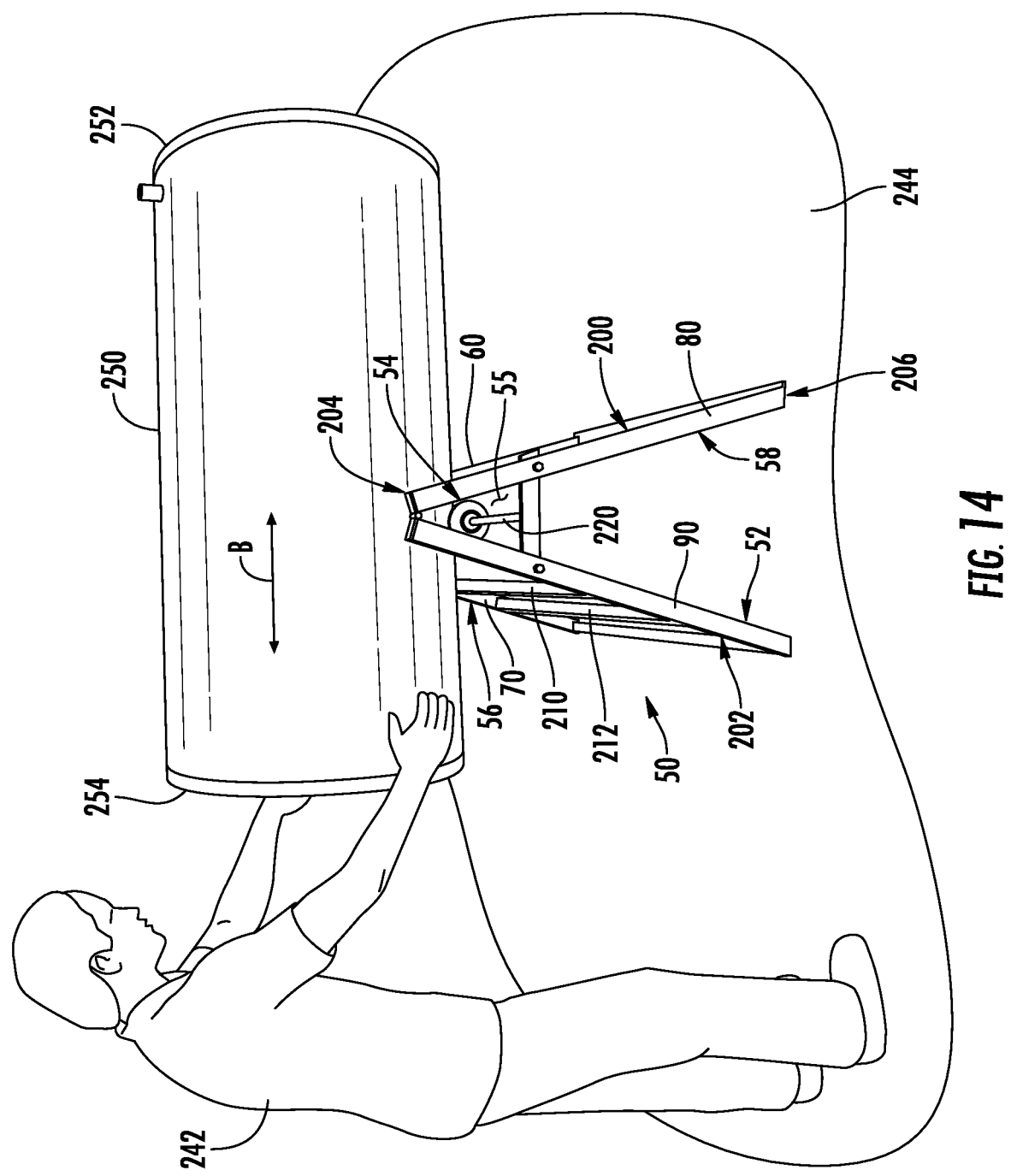
Figure 15:
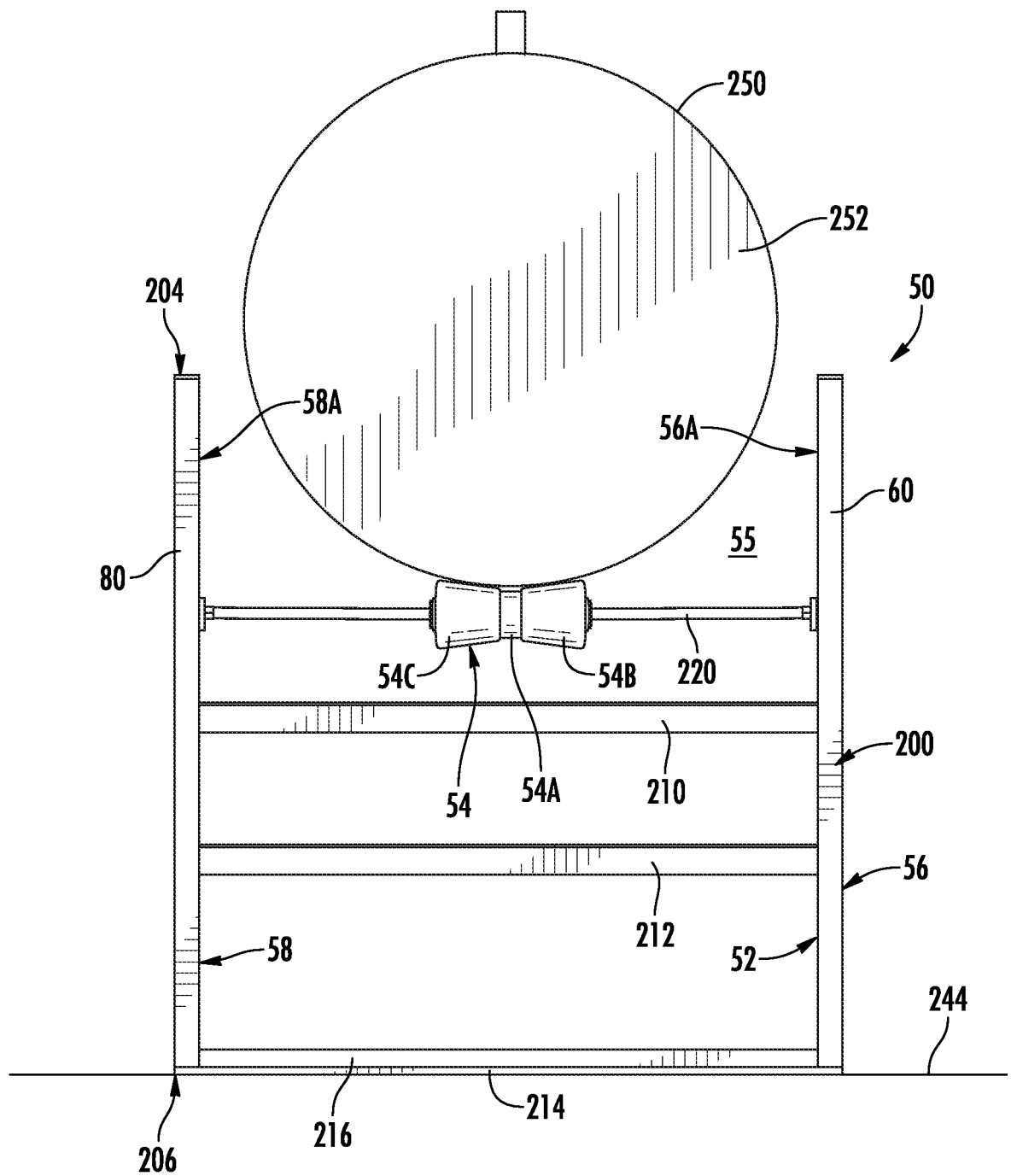

Apparatus 50 is configured to handle heavy, tall, and unwieldy loads not readily or easily manageable by hand as shown in FIGS. 11-15, such as for load loading and off-loading to and from storage areas. In FIG. 11, a workman 242 uses apparatus 60 to handle a load, a standard water heater 250 in this example, a generally cylindrical fixture including a flat lower end 252 and a flat lower upper end 254 configured with an attached handle 256 and that is approximately five feet tall from its lower end 252 to its upper end 254. He situates the framework 52 extending upright from the bottom 206, the ground-engaging extremity of the apparatus 40, against the ground 244 to the top 204, locating the roller 54 in the load-reception area 55 at an elevated location over the ground 244, approximately thirty inches above the framework's 52 bottom 206 in this example. The framework 52, a ladder framework, an open A-frame formed by the connected A-frame stands 56 and 58, is stable resistant to tipping when so positioned upright on the ground 244. The workman 242 positions the water heater 250 upright on the ground 244 from its lower end 252 to its upper end 254. He tips the water heater 250 forwardly just enough to enable him to slip front section's 202 stay 214 under the water heater's 250 lower end 252, locating the upright water heater 250 in the load-reception area 55 between the stands 56 and 58 at the framework's 52 front section 200 confronting the roller 54 centered between the water heater's 250 sides, the water heater 250 extending upright through the load-reception area 55 of the framework's 52 front section 200 from the lower end 252 on the ground 244 past the roller 54 in FIG. 11 to the framework's 52 top 204 and therebeyond from the load-reception area 55 and the top 204 to the water heater's 250 upper end 254 in FIGS. 11 and 12. The workman 242 braces the framework 52 behind its rear section 202 in FIG. 11 by stepping on one of the rungs 210 and 212, rung 212 in this example, with one foot while he stands confidently on the ground 244 with his other foot. At the same time, he holds the water heater 250 firmly by his hands, one gripping the handle 256 and the other holding the water heater's 250 side near its upper end 254 in this example. He pulls the water heater 250 rearwardly in the direction of the arrow A in FIG. 11, tipping the water heater 250 rearwardly in the same direction against the roller 54 in FIG. 13 between the water heater's 250 lower and upper ends 252 and 254. In one assured, confident stroke, he again pulls the water heater 250 rearwardly in the direction of the arrow A in FIG. 11, pivoting the water heater 250 at its midsection against and over the roller 54 and through the load-reception area 55 without interference, elevating the water heater 250 up and over the roller 54 longitudinally over the ground 244 in FIGS. 14 and 15 into and through the load-reception area 55, the roller 54 rolling under the water heater 250 in response to the water heater 250 translating over the roller 54 in response. In FIG. 15, the roller's 54 self-centering attribute enables the roller 54 to self-center the water heater 250 in the load-reception area 55 between the stands 56 and 58 when the water heater 250 is brought into contact with and pulled over the roller 54. Now suspended longitudinally over the ground 244 atop the roller 54 in FIGS. 14 and 15, the water heater 250 extends longitudinally through the load-reception area 55 from the rear section 202 to the front section 200 from its lower end 252 behind the framework's 52 rear section 202 to its upper end 254 ahead of the framework's 52 front section 200. The width of the roller-supported water heater 250 extends upward through the load-reception area 55 along the rear section 202 from above the rung 210 to and beyond the top 204 and downward along the front section 200 from the top 204 to between the framework's top 204 and bottom 206, the sections 56A and 58A of the respective stands 56 and 58 flanking either side of the water heater 250. The framework's 52 sections 56A and 58A on either side of the roller-supported water heater 250 confine the load, the water heater 250 in this example, therebetween, disabling the water heater 250 from inadvertently displacing outwardly from either side of the framework 52. The workman 242 standing behind the framework's 52 rear section 202 and holding the water heater 250 by hand in FIG. 14 can translate the water heater 250 longitudinally through the unobstructed load-reception area 55 in reciprocal directions indicated by the double arrow B without interference, the roller 54 rotating under the water heater 250 in opposite directions in response. This enables the workman 242 to maneuver the water heater 250 through the load-reception area and offload the water heater 250 from the roller 54 onto an elevated platform, shelf, or stand for storage or transport from the load-reception area 55 from the framework's 52 front section 200 or rear section 202. The workman 242 can reverse this operation for loading the water heater 250 onto the roller 54 from an elevated platform, shelf, or stand and offloading the water heater 250 from the roller 54 and onto the ground 244 into its upright position. The roller 54 of the apparatus 50 is configured to self-center cylindrical or outwardly-curved loads, like the water heater 250. The apparatus 50 can be configured with any suitable form of self-centering roller configured to self-center loads of vary shape, such as dog bone roller, a reel roller, or other chosen self-centering roller.

Figure 20:
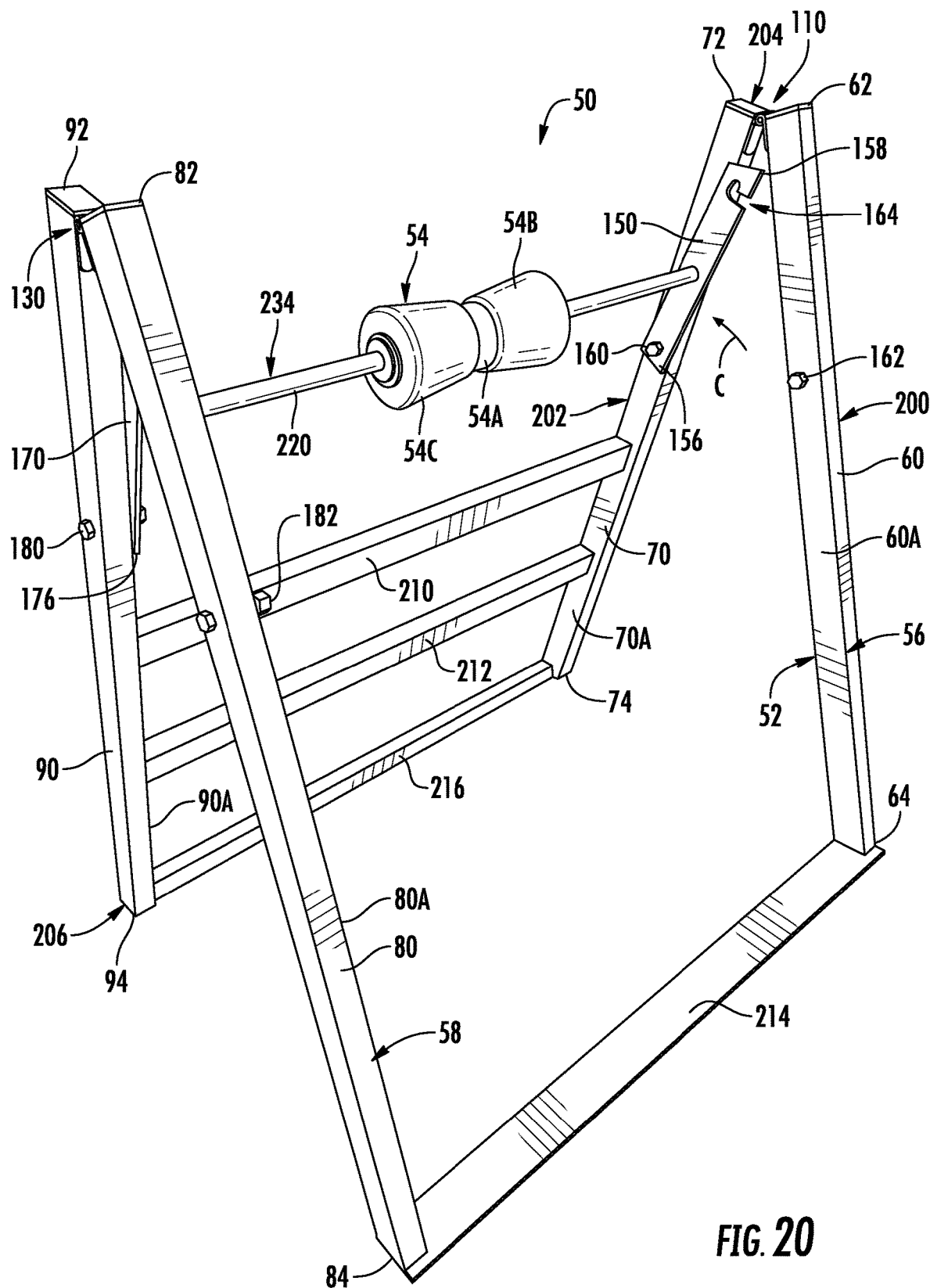
Figure 21:
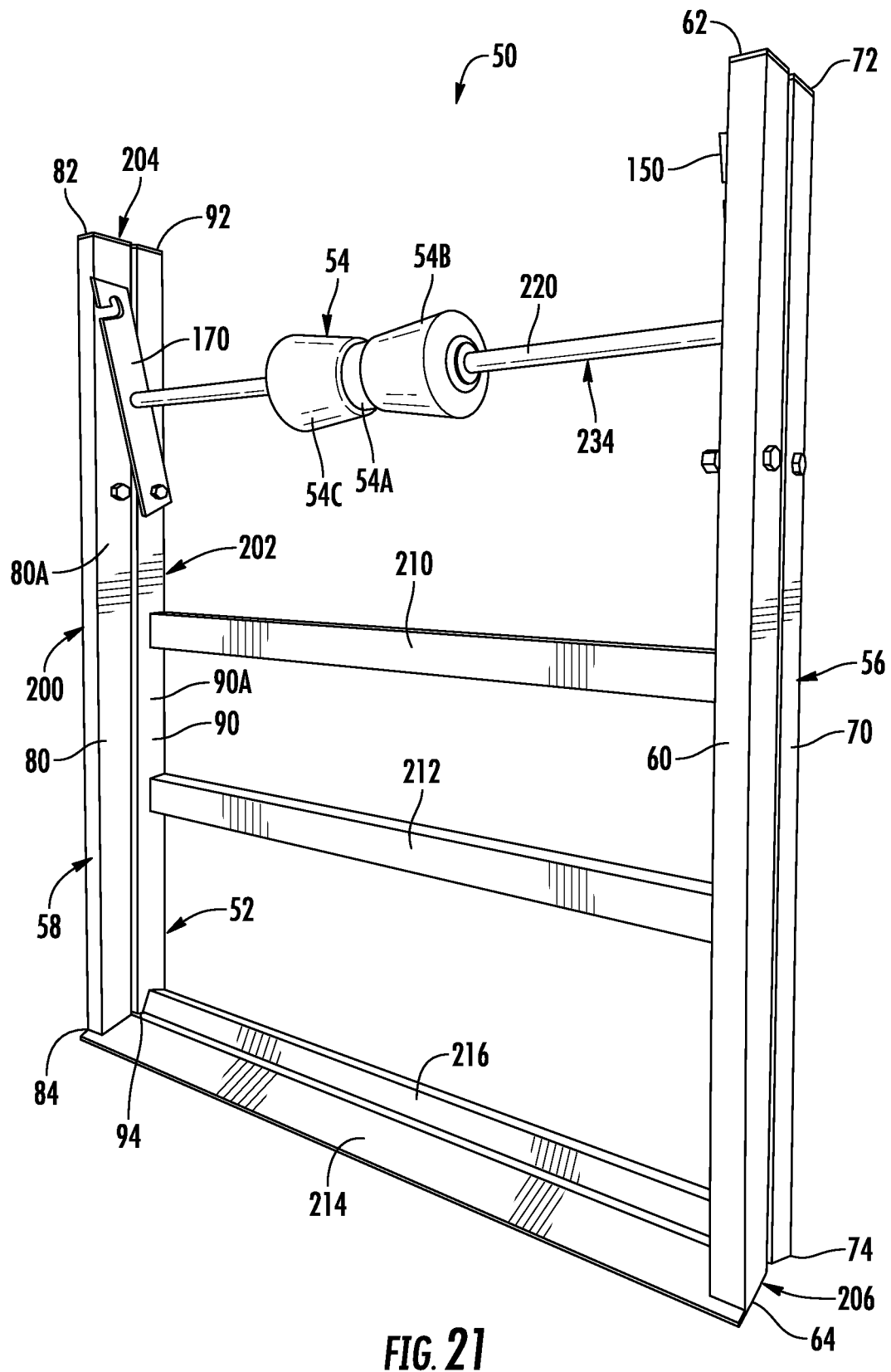
Figure 22:
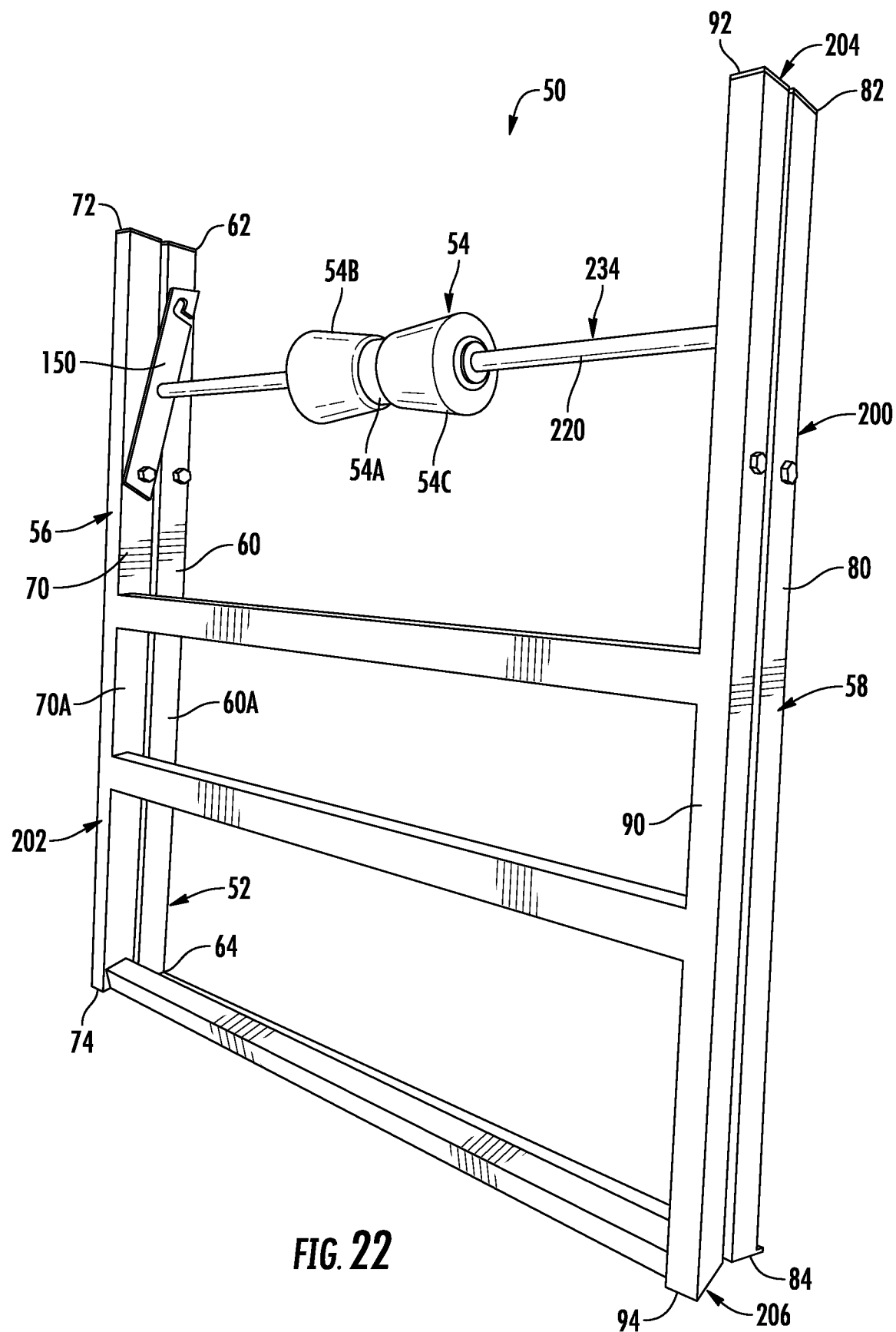

The stays 150 and 170 are locked in FIGS. 1-5 and 11-15, coupled between the stand's 56 front and rear legs 60 and 70 and the stand's 58 front and rear legs 80 and 90, respectively, securing the apparatus 50 in its operative load-handling configuration, its open A-frame configuration described herein. When the stays 150 and 170 are locked, coupled between the stand's 56 front and rear legs 60 and 70 and the stand's 58 front and rear legs 80 and 90, they are disabled from pivoting about the respective fasteners 160 and 180 and concurrently secure the respective stand's 56 and 58 in their A-frame configurations and the axle 220 and its attached roller 54 between the stands 56 and 58. The stays 150 and 170 are unlocked, releasing the apparatus 50 from its operative, load-handling A-frame configuration, when their distal ends 158 and 178 are detached from the respective front legs 60 and 80 in FIGS. 18-20. When the stays 150 and 170 are unlocked, released from the respective front legs 60 and 80 in FIGS. 18 and 19, they are enabled to concurrently pivot upwardly in the direction of the arrow C in FIG. 20 toward framework's 52 top 204 about the fasteners 160 and 180 at the respective proximal ends 156 and 176. At the same time, the front legs 60 and 80 of the front section 200 and the rear legs 80 and 90 of the rear section 202 are released from their fixed positions in FIG. 20 and enabled to turn or otherwise displace together pivotally at the respective hinges 110 and 130 out of their respective fixed or unfolded positions to their respective collapsed or folded positions in FIGS. 21 and 22, longitudinally juxtaposing the front legs 60 and 80 of the front section 200 with the respective rear legs 70 and 90 of the rear section 202 for compact storage of the apparatus 50. In other words, the framework's 52 front and rear sections 200 and 202 are enabled to fold together out of their unfolded A-frame configuration about the respective hinges 110 and 130 to a folded collapsed configuration in FIGS. 21 and 22 and unfolded from their folded configuration to the A-frame configuration in FIG. 20 when the stays 150 and 170 are concurrently released from the respective front legs 60 and 80.

Figure 16:
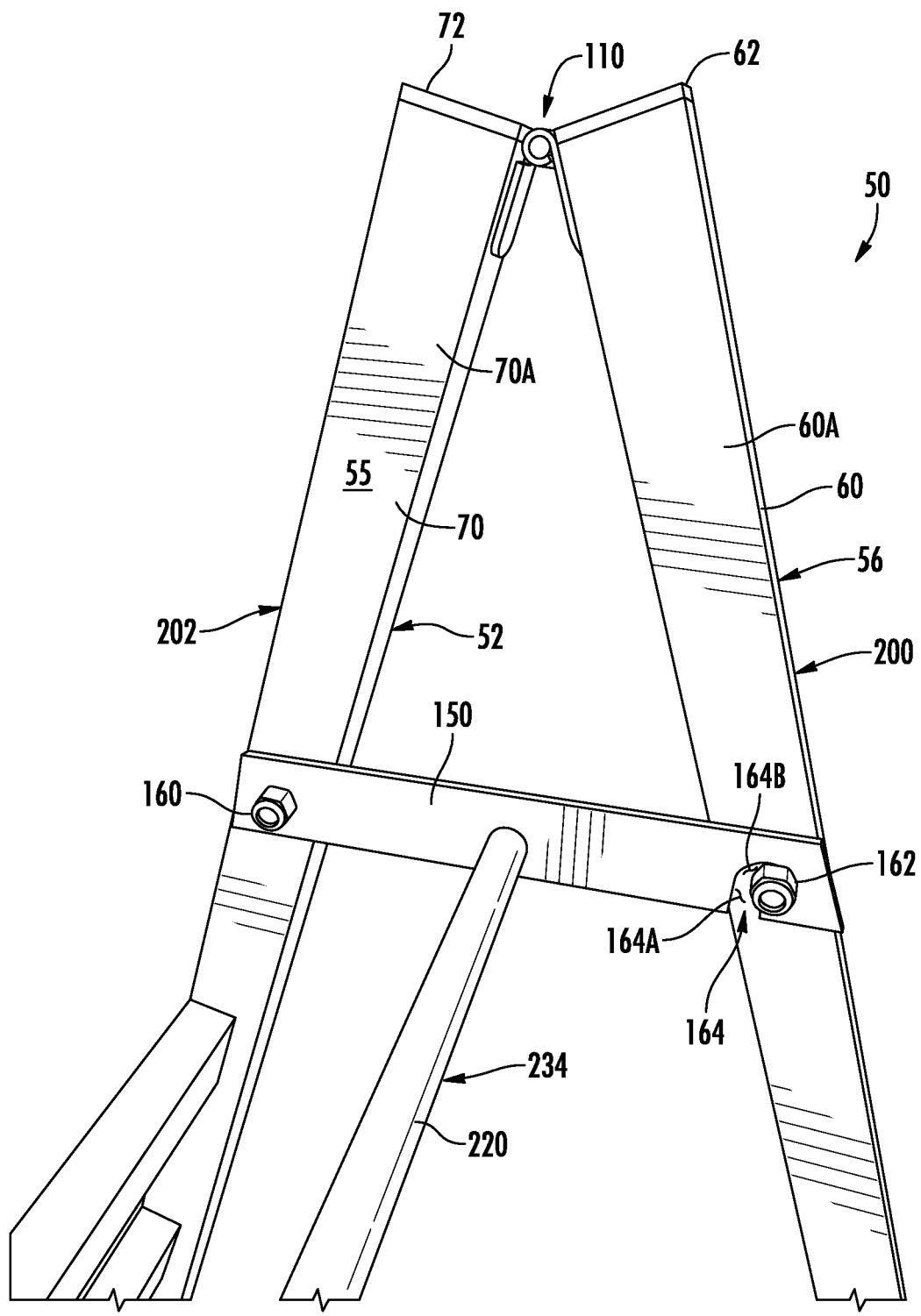
FIGS. 16, 16A, 17, 17A, and 18-22 illustrate a sequence of steps of collapsing the embodiment of FIG. 1 to a storage configuration.
Figure 16A:
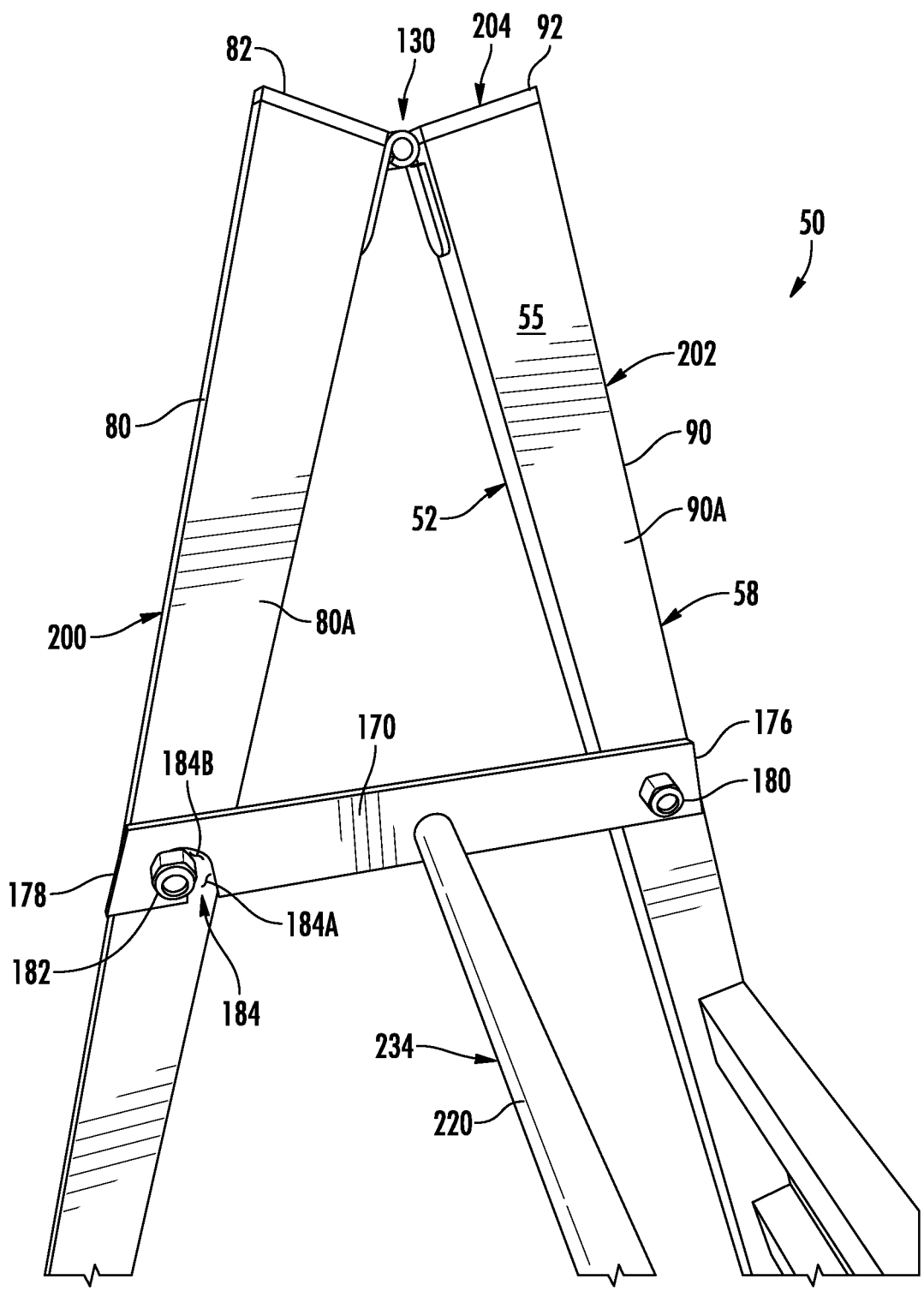
Figure 17:
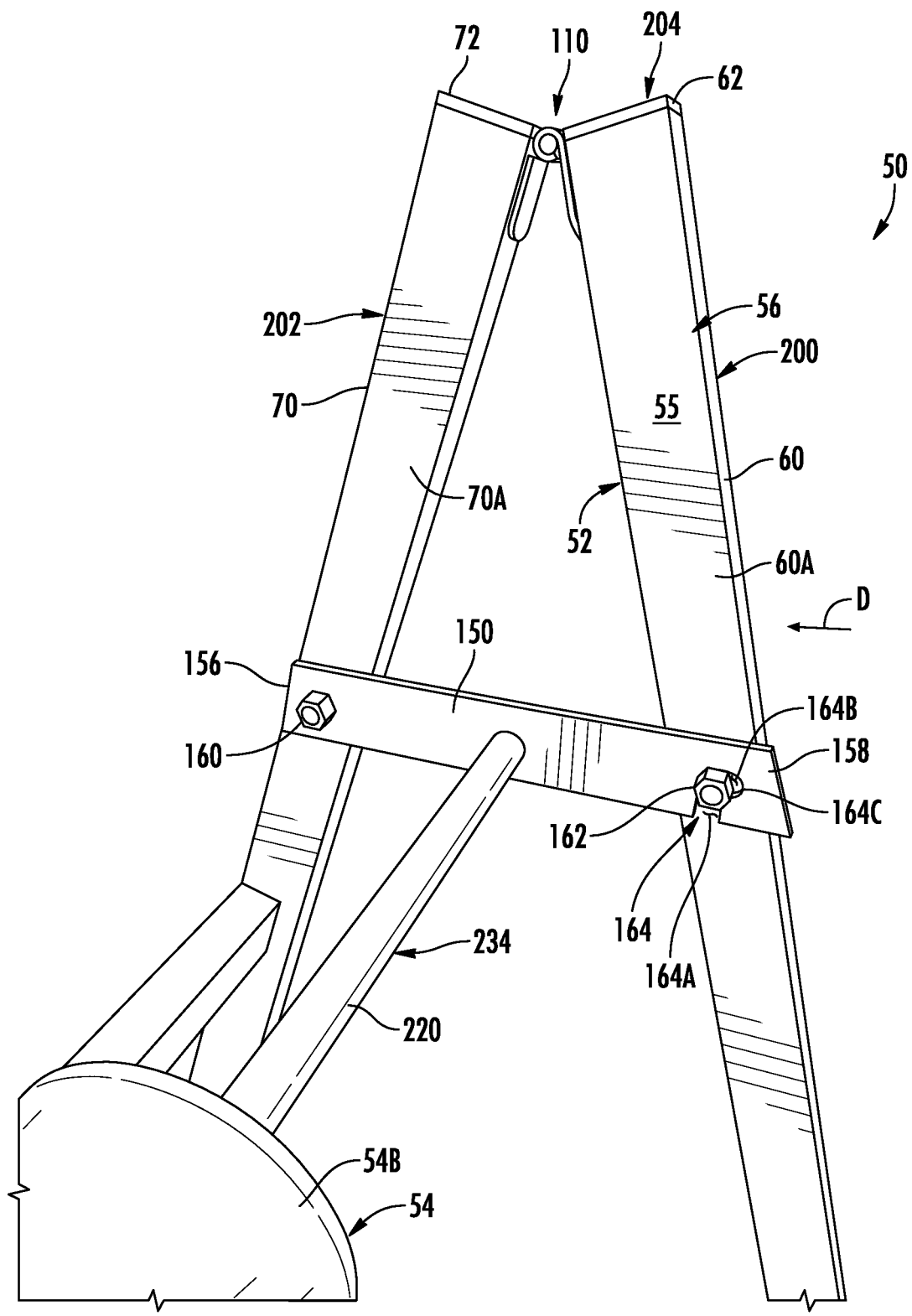
Figure 17A:
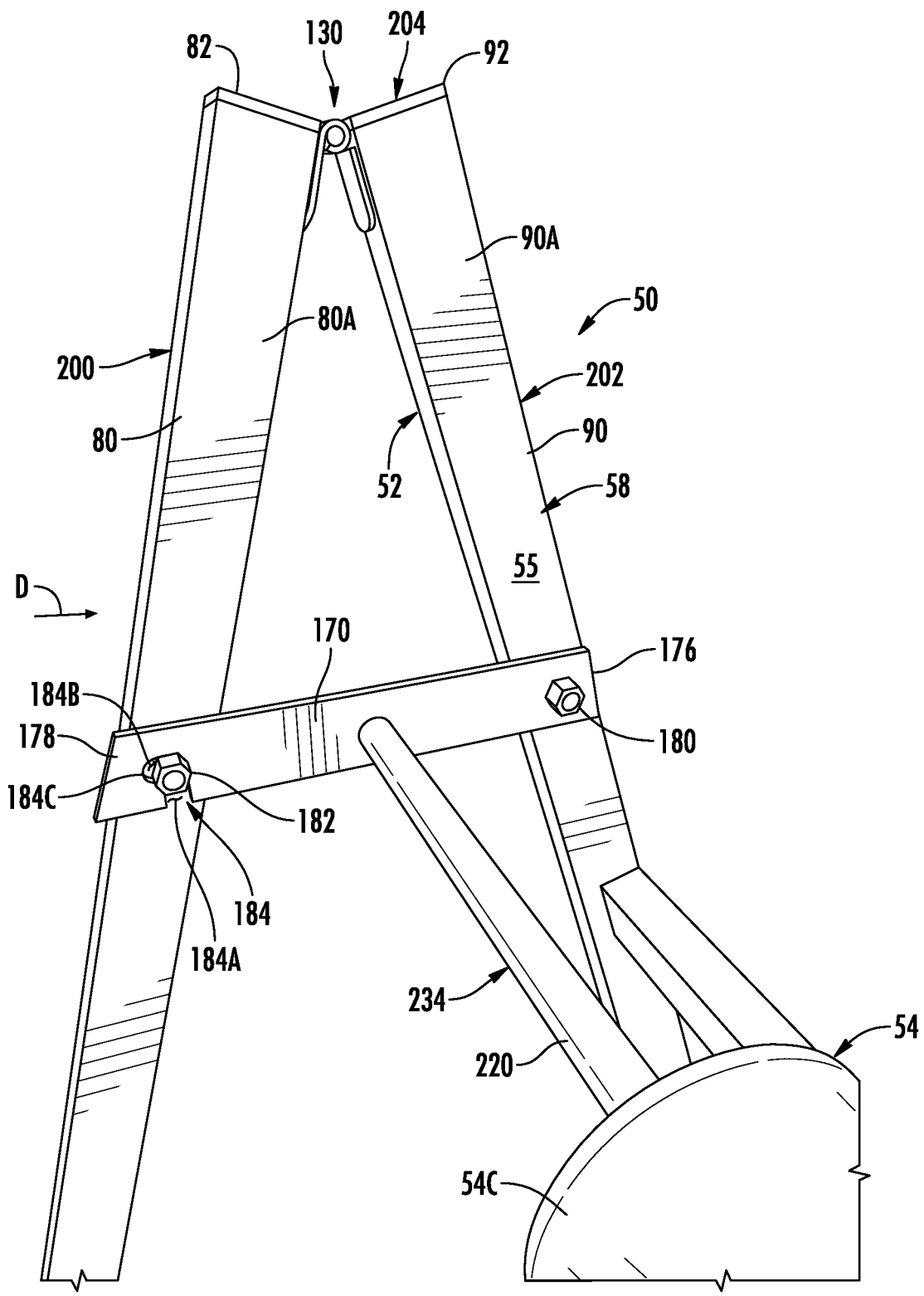

A user unlocks the stays 150 from their locked positions by pivotally displacing framework's 50 front section 200 inwardly in the direction of the arrow D in FIGS. 16 and 16A toward the framework's 52 rear section 202 at the respective hinges 110 and 113. This concurrently translates the pins 162 and 182 in the same direction through the respective distal slot components 164B and 184B to the respective proximal slot components 164A and 184A in FIGS. 17 and 17A. This enables the user to concurrently pivot the stays 150 and 170 at their proximal ends 158 and 178 about the respective fasteners 160 and 180 upwardly and away from the respective pins 162 and 182 in the direction of the arrow C in FIGS. 17 and 17A, withdrawing the respective proximal slot components 164A and 184A from over the respective pins 162 and 182, unlocking the stays 150 and 170 by releasing or otherwise detaching the distal ends 158 and 178 of the stays 150 and 170 from the respective front legs 60 and 80 in FIGS. 18 and 19. The user may now collapse the apparatus 50 for convenient storage by pivoting the roller assembly 230 at the proximal ends 158 and 178 about the respective fasteners 160 and 180 upwardly in the direction of the arrow C in FIGS. 18-20 toward the upper ends 72 and 92 of the respective rear legs 70 and 90, longitudinally juxtaposing the stays 150 and 170 along the inner sides 70A and 90A of the respective rear legs 70 and 90 with the axle 220 supporting is roller 54 therebetween. The user finishes collapsing the apparatus 50 by pivoting or otherwise turning the front and rear sections 200 and 202 about the respective hinges 110 and 113 together, folding the front and rear sections 200 and 202 together from their A-frame configuration to their folded or collapsed configuration, juxtaposing the front section 200 with the rear section 202, longitudinally juxtaposing the front legs 60 and 80 relative to the respective rear legs 70 and 90 in FIGS. 21 and 22. A user need only reverse this operation to convert the apparatus 50 from its collapsed configuration to it's operative, load-receiving A-frame configuration for continued use.

The present invention is described above with reference to illustrative embodiments. Those skilled in the art will recognize that changes and modifications may be made in the described embodiments without departing from the scope of the present invention. For instance, although the stay's 150 proximal end 156 is coupled to the rear leg 70 releasably and pivotally and the stay's 150 distal end 158 is configured to lock or otherwise couple releasably to the front leg 60, and the stay's 170 proximal end 176 is coupled to the rear leg 90 releasably and pivotally, and the stay's 170 distal end 178 is configured to lock or otherwise couple releasably to the front leg 80, this can be reversed. Moreover, while roller 54 is configured to rotate about its supporting axle 220, it may be fixed to axle 220 journaled for rotation to the respective stays 150 and 170, enabling the axle 220 and its attached roller 54 to concurrently rotate about axis X of rotation.

Figure 23:
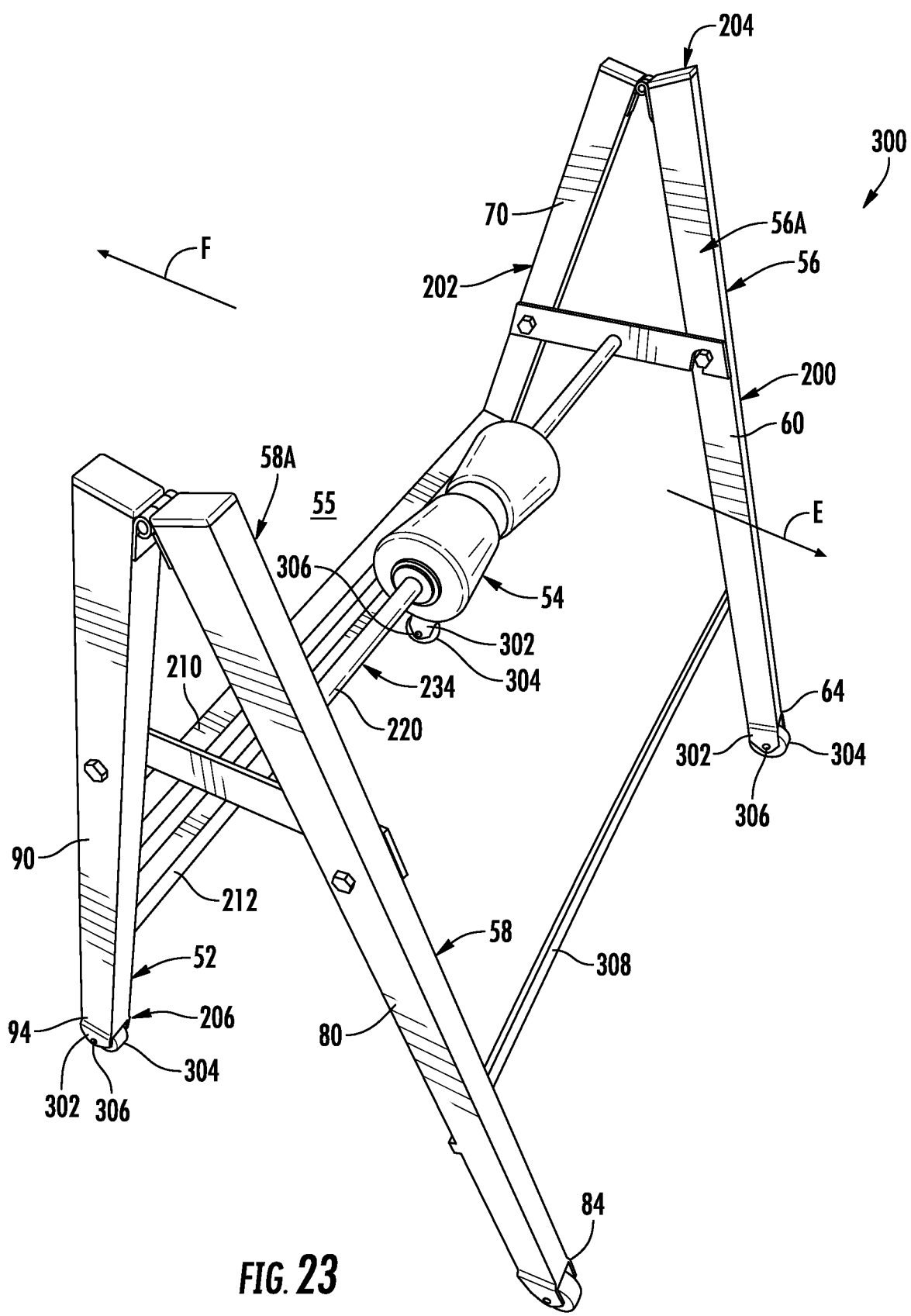
FIGS. 23 and 24 are perspective views of an alternate embodiment of a portable load-handling apparatus constructed and arranged in accordance with the invention.
Figure 24:
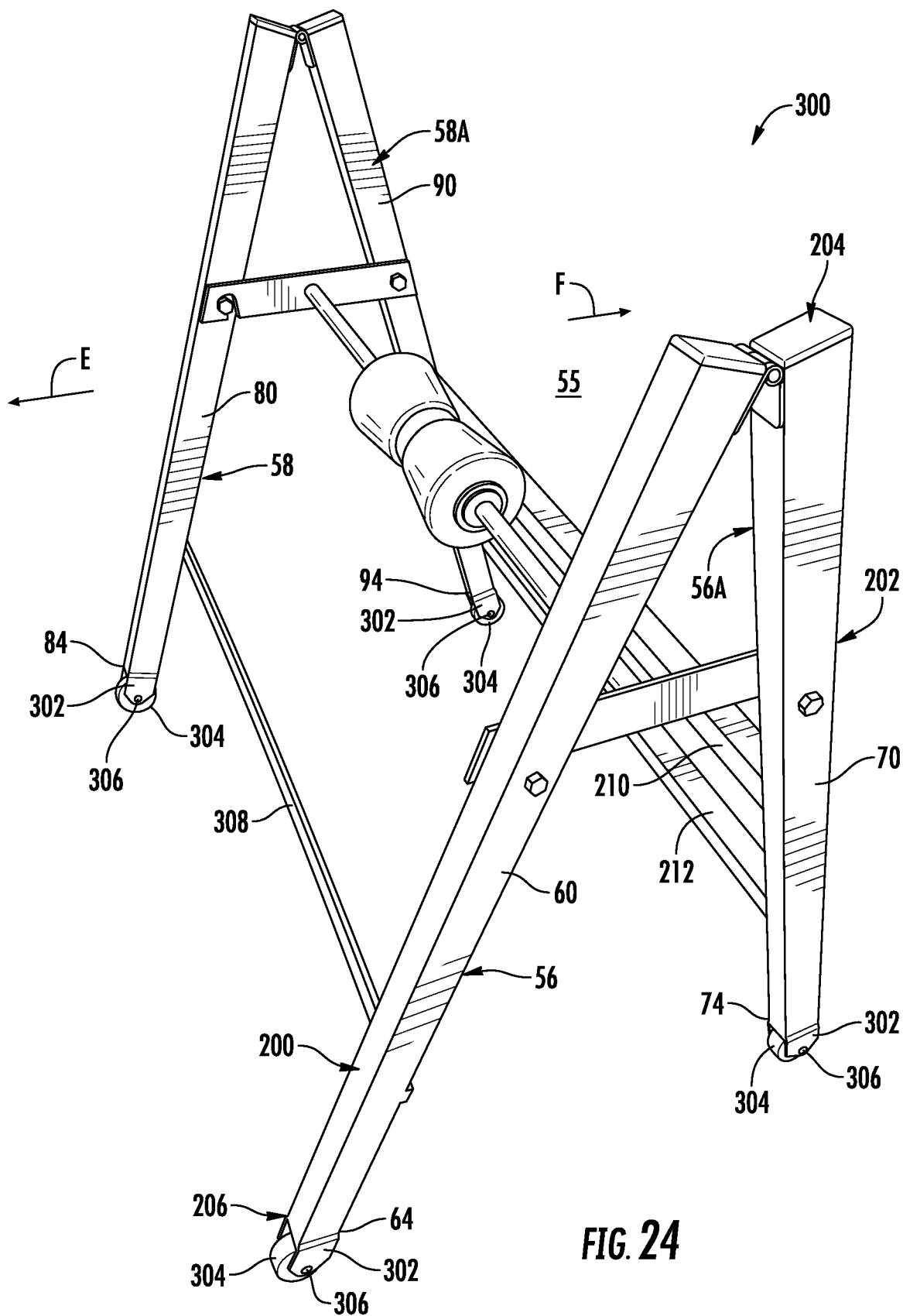

The bottom 206 of the framework 52 is not wheeled, configured to rest solidly on the ground. If desired, the bottom of a load-handling apparatus constructed and arranged according to the invention can be wheeled to enable its wheeled movement over the ground. FIGS. 23 and 24 illustrate such an embodiment.

In common with apparatus 50, the alternate embodiment of a load-handling apparatus 300 in FIGS. 23 and 24 shares framework 52, load-reception area 55, roller assembly 234, and their respective appurtenances described in detail above. In apparatus 300, however, the lower ends 64, 74, 84, and 94 are wheeled, enabling wheeled movement of the framework 52 over the ground. Lower ends 64, 74, 84 and 94 each include a downwardly-extending bifurcated wheel support 302 and a wheel 304 mounted rotatably thereto by a standard stub axle 306. The wheels 304 are unidirectional, caster-type wheels in this example, configured to restrain wheeled movement of the framework 52 in opposite directions, forward in the direction of the arrow E leading with the front section 200, and backward in the direction of the arrow F leading with the rear section 202, the wheels 304 restraining the framework 52 from rolling side-to-side. This wheeled configuration of the framework 52 enables a user to roll the apparatus 300 back and forth, forward and backward, for easily positioning the apparatus 300 and loads supported atop the roller 54 as needed without the apparatus 300 rolling from side-to-side. A stay 308 extending along a flat plane at the framework's 52 front section 200 extends between and connects the front legs 60 and 80, reinforcing them and preventing them from spreading apart. Other than rungs 210 and 212, rear section 202 has no additional stay in this example. The stay 270 is connected to the front leg 60 between its upper and lower ends 62 and 64 and to the front leg 80 between its upper and lower ends 82 and 84, and is below the axle 220 and the roller 54 it carries.

Apart from the axle 220 and the roller 54 it carries, the framework 52 of the apparatus 300, like the framework 52 of the apparatus 50, is rungless, stepless, and stayless, namely, obstructionless, meaning that that the framework 52 is without any rung, step, stay, or other obstruction between or otherwise extending between the stands 56 and 58, between the rear legs 70 and 90 of rear section 202, from the uppermost rung 210 below the axle 220 and the roller 54 it carries to the top 204, and between the front legs 60 and 80 of front section 200, from the top 204 to below the axle 220 and the roller 54 it carries and, in this embodiment, to the front section's 200 stay 308. In other words, the obstructionless attribute of the framework 52 of the apparatus 300 according to this disclosure means that framework 52 is without any rung, step, stay, or other obstruction between or otherwise extending between the stands 56 and 58, the A-frames, between the load-confinement sections 56A and 58A, from the axle 220 and the roller 54 it carries to the top 204 and to the front section 200 and the rear section 202 from below the axle 220 and the roller 54 it carries to the top 204, in this embodiment from the uppermost rung 210 to the top 204 and from the top 204 to below the axle 220 and the roller 54 it carries to the front section's 200 stay 308. This defines the load-reception area 55 of the apparatus 50 that is entirely open outwardly from the framework 52 and inwardly to the roller 54 between the stands 56 and 58 without any interference or obstruction between the stands 56 and 58, the A-frames, between the load-confinement sections 56A and 58A, from the axle 220 and the roller 54 it carries to the top 204 and to the front section 200 and the rear section 202 from below the axle 220 and the roller 54 it carries to the top 204, in this embodiment along the rear section 202 from the rung 210 to the top 204 and along the front section 200 from the top 204 to below the axle 220 and the roller 54 it carries to the stay 308, enabling the load-reception area 55, open outwardly without interference from the framework 52 and the roller 54 it supports, to accept a load atop the roller 54 as described herein.

Various further changes and modifications to the embodiments herein chosen for purposes of illustration will readily occur to those skilled in the art. To the extent that such modifications and variations do not depart from the invention, they are intended to be included within the scope thereof.

The invention claimed is:

1. An apparatus for handling loads, comprising:
a framework comprising axially spaced apart stands each including a front extremity and a rear extremity extending upright between a lower end and an upper end, the front extremities, the rear extremities, the lower ends, and the upper ends comprising a front section, a rear section, a ground-engaging bottom, and a top, respectively, of the framework, and an axle intermediate the top and the bottom between the front section and the rear section, the axle coupled between the stands;
a load-supporting roller carried by the axle and configured to rotate, the roller intermediate the top and the bottom between the front section and the rear section; and
the framework being without any obstruction extending between the stands above the roller thereby defining a load-reception area open to the roller without interference between the stands along the rear section and the front section from the top to the roller.

2. The apparatus according to claim 1, further comprising the roller centered between the stands.

3. The apparatus according to claim 1, further comprising the roller configured to rotate relative to the axle.

4. The apparatus according to claim 1, the roller comprising a self-centering keel roller.

5. The apparatus according to claim 4, the keel roller comprising a medial groove between inclined sections.

6. The apparatus according to claim 1, wherein the lower ends of the respective stands are wheeled.

7. The apparatus according to claim 6, wherein the lower ends of the respective stands are wheeled by unidirectional wheels configured to restrain wheeled movement of the framework in opposite directions.

8. An apparatus for handling loads, comprising:
a framework comprising:
a first stand;
a second stand;
the first stand and the second stand axially spaced apart and each including a) front leg and a rear leg each having an upper end and a lower end, b) the upper end of the front leg attached to the upper end of the rear leg, c) the front leg and the rear leg extending downwardly to the respective lower ends from the respective upper ends, and d) a stay coupled between the front leg and the rear leg securing the front leg and the rear leg at fixed positions relative to one another;
the front legs, the rear legs, the upper ends, and the lower ends comprising a front section, a rear section, a top, and a ground-engaging bottom, respectively, of the framework; and
an axle intermediate the top and the bottom between the front section and the rear section and coupled between the stay of the first stand and the stay of the second stand;
a load-supporting roller carried by the axle and configured to rotate, the roller intermediate the top and the bottom between the front section and the rear section; and
the framework being without any obstruction extending between the stands above the roller thereby defining a load-reception area open to the roller without interference between the stands along the rear section and the front section from the top to the roller.

9. The apparatus according to claim 8, further comprising the roller centered between the stands.

10. The apparatus according to claim 8, further comprising the roller configured to rotate relative to the axle.

11. The apparatus according to claim 8, the roller comprising a self-centering keel roller.

12. The apparatus according to claim 11, the keel roller comprising a medial groove between inclined sections.

13. The apparatus according to claim 8, further comprising the upper ends of the respective stands attached hingedly by respective hinges.

14. The apparatus according to claim 13, further comprising:
the stays mounted to the respective stands for movement between locked positions and unlocked positions, the stays in the locked positions concurrently securing the front leg and the rear leg of the respective stands at the fixed positions relative to one another; and
the front leg and the rear leg of the respective stands enabled to displace pivotally at the respective hinges, when the stays are in the unlocked positions.

15. The apparatus according to claim 8, wherein the lower ends of the respective stands are wheeled.

16. The apparatus according to claim 15, wherein the lower ends of the respective stands are wheeled by unidirectional wheels configured to restrain wheeled movement of the framework in opposite directions.

* * * * *